(12) United States Patent
Street et al.

(10) Patent No.: US 11,891,039 B2
(45) Date of Patent: Feb. 6, 2024

(54) VEHICLE BRAKE PEDAL WITH PEDAL RESISTANCE ASSEMBLY AND FORCE/POSITION SENSOR

(71) Applicant: CTS CORPORATION, Lisle, IL (US)

(72) Inventors: Steven John Street, Glen Ellyn, IL (US); John Jablonski, Chicago, IL (US); Xiaofeng Huang, Chicago, IL (US); Douglas C. Moore, Chicago, IL (US); Eric Brannstrom, Elburn, IL (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 17/980,981

(22) Filed: Nov. 4, 2022

(65) Prior Publication Data

US 2023/0136473 A1   May 4, 2023

Related U.S. Application Data

(60) Division of application No. 16/867,733, filed on May 6, 2020, now Pat. No. 11,597,366, which is a
(Continued)

(51) Int. Cl.
*B60T 8/40* (2006.01)
*G01L 5/22* (2006.01)
(Continued)

(52) U.S. Cl.
CPC ............ *B60T 8/4086* (2013.01); *B60T 7/042* (2013.01); *B60T 7/06* (2013.01); *G01L 5/225* (2013.01)

(58) Field of Classification Search
CPC .......... B60T 8/4086; B60T 7/042; B60T 7/06; G01L 5/225
See application file for complete search history.

(56) References Cited

U.S. PATENT DOCUMENTS

| 3,636,760 A | 1/1972 | Shoberg |
| 4,120,387 A | 10/1978 | Otteblad et al. |

(Continued)

FOREIGN PATENT DOCUMENTS

| CN | 201989768 U | 9/2011 |
| DE | 19781694 T1 | 3/1999 |

(Continued)

OTHER PUBLICATIONS

Machine translation of WO 0140038 A1, obtained from FIT database. (Year: 2001).*
(Continued)

*Primary Examiner* — Thomas C Diaz
(74) *Attorney, Agent, or Firm* — Michael Best & Friedrich LLP

(57) ABSTRACT

A brake pedal assembly comprising a pedal and a pedal resistance force member operably coupled to the pedal. A damper pedal resistance force module defines an interior fluid-filled cavity. A shaft extends through the damper module and includes a piston mounted thereon and moveable through the fluid-filled cavity to generate a damper resistance force. A spring pedal resistance force module is adapted to generate a spring pedal resistance force. A pedal force sensing module is mounted to the pedal resistance force member. A pedal position sensor is mounted to the pedal resistance force member. A pedal force sensor is mounted to the pedal resistance force member.

9 Claims, 13 Drawing Sheets

Related U.S. Application Data continuation-in-part of application No. 16/439,822, filed on Jun. 13, 2019, now Pat. No. 10,654,452, which is a continuation of application No. 15/876,772, filed on Jan. 22, 2018, now Pat. No. 10,343,657.

(60) Provisional application No. 62/992,944, filed on Mar. 21, 2020, provisional application No. 62/845,401, filed on May 9, 2019.

(51) Int. Cl.
    *B60T 7/06* (2006.01)
    *B60T 7/04* (2006.01)

(56) References Cited

U.S. PATENT DOCUMENTS

| | | |
|---|---|---|
| 4,206,636 A | 6/1980 | Hendrix |
| 4,395,883 A | 8/1983 | Melinat |
| 4,888,997 A | 12/1989 | Eckert et al. |
| 5,115,186 A | 5/1992 | Reinartz et al. |
| 5,168,750 A | 12/1992 | Kurtz |
| 5,333,706 A | 8/1994 | Mori |
| 5,335,563 A | 8/1994 | Yamamoto et al. |
| 5,350,225 A | 9/1994 | Steiner et al. |
| 5,385,068 A | 1/1995 | White et al. |
| 5,416,295 A | 5/1995 | White et al. |
| 5,427,442 A | 6/1995 | Heibel |
| 5,564,797 A | 10/1996 | Steiner et al. |
| 5,590,937 A | 1/1997 | Heibel |
| 5,793,007 A | 8/1998 | Matsumoto |
| 5,839,280 A | 11/1998 | Troester et al. |
| 5,962,997 A | 10/1999 | Maisch |
| 6,008,604 A | 12/1999 | Maisch |
| 6,105,737 A | 8/2000 | Weigert et al. |
| 6,186,026 B1 | 2/2001 | Shaw et al. |
| 6,213,572 B1 | 4/2001 | Linkner, Jr. et al. |
| 6,217,131 B1 | 4/2001 | Schanzzenbach |
| 6,226,586 B1 | 5/2001 | Luckevich et al. |
| 6,238,011 B1 | 5/2001 | Heckmann |
| 6,253,635 B1 | 7/2001 | Huber |
| 6,270,172 B1 | 8/2001 | Shirai et al. |
| 6,289,762 B1 | 9/2001 | Silva |
| 6,298,746 B1 | 10/2001 | Shaw |
| 6,305,506 B1 | 10/2001 | Shirai et al. |
| 6,330,838 B1 | 12/2001 | Kalsi |
| 6,367,886 B1 | 4/2002 | Shaw |
| 6,390,565 B2 | 5/2002 | Riddiford et al. |
| 6,405,117 B1 | 6/2002 | Allen et al. |
| 6,408,712 B1 | 6/2002 | Venkata et al. |
| 6,412,882 B1 | 7/2002 | Isono et al. |
| 6,422,658 B1 | 7/2002 | Valeriano et al. |
| 6,431,304 B1 | 8/2002 | Smythe |
| 6,450,588 B2 | 9/2002 | Grote et al. |
| 6,464,306 B2 | 10/2002 | Shaw et al. |
| 6,471,304 B1 | 10/2002 | Deml et al. |
| 6,531,667 B2 | 3/2003 | Becker et al. |
| 6,542,793 B2 | 4/2003 | Kojima et al. |
| 6,554,088 B2 | 4/2003 | Severinsky et al. |
| 6,554,744 B2 | 4/2003 | Schmidt |
| 6,571,662 B1 | 6/2003 | Kolita |
| 6,577,119 B1 | 6/2003 | Yaddehige |
| 6,580,352 B1 | 6/2003 | Pino et al. |
| 6,591,710 B1 | 7/2003 | Shaw |
| 6,619,039 B2 | 9/2003 | Zehnder, II et al. |
| 6,658,963 B2 | 12/2003 | Yaddehige |
| 6,679,135 B1 | 1/2004 | Faigle et al. |
| 6,684,987 B2 | 2/2004 | Stachowski et al. |
| 6,736,233 B2 | 5/2004 | Beishline et al. |
| 6,744,360 B2 | 6/2004 | Fulks et al. |
| 6,862,950 B2 | 3/2005 | O'Neill |
| 7,134,327 B2 | 11/2006 | Saito et al. |
| 7,198,336 B2 | 4/2007 | Yamamoto et al. |
| 7,331,256 B2 | 2/2008 | Allard et al. |
| 7,347,510 B2 | 3/2008 | Schluter |
| 7,395,734 B2 | 7/2008 | Fujiwara et al. |
| 7,401,865 B2 | 7/2008 | Shaw |
| 7,438,368 B2 | 10/2008 | Kohler et al. |
| 7,614,320 B2 | 11/2009 | Fukase |
| 7,650,212 B2 | 1/2010 | Breed et al. |
| 7,712,371 B2 | 5/2010 | Fujiwara |
| 7,726,195 B2 | 6/2010 | Truesdale et al. |
| 7,748,791 B2 | 7/2010 | Joyce |
| 7,748,792 B2 | 7/2010 | Crombez et al. |
| 7,765,893 B2 | 8/2010 | Chol |
| 7,770,491 B2 | 8/2010 | Ritter et al. |
| 7,823,985 B2 | 11/2010 | Hatano |
| 7,856,918 B2 | 12/2010 | Nen et al. |
| 8,042,430 B2 | 10/2011 | Campbell |
| 8,076,874 B2 | 12/2011 | Ueno et al. |
| 8,090,514 B2 | 1/2012 | Tarasinski et al. |
| 8,165,747 B2 | 4/2012 | Ueno et al. |
| 8,239,100 B2 | 8/2012 | Ueno et al. |
| 8,266,982 B2 | 9/2012 | Peniston et al. |
| 8,305,073 B2 | 11/2012 | Kather |
| 8,321,111 B2 | 11/2012 | Ueno et al. |
| 8,333,130 B2 | 12/2012 | Fujiwara |
| 8,340,863 B2 | 12/2012 | Karatsinides |
| 8,359,140 B2 | 1/2013 | Kodaka et al. |
| 8,496,302 B2 | 7/2013 | Fukushima |
| 8,522,640 B2 | 9/2013 | Bryce |
| 8,523,297 B2 | 9/2013 | Morishita |
| 8,596,162 B2 | 12/2013 | Nozu et al. |
| 8,634,985 B2 | 1/2014 | Zettel et al. |
| 8,635,930 B2 | 1/2014 | Willemsen et al. |
| 8,706,358 B2 | 4/2014 | DeWitt |
| 8,706,375 B2 | 4/2014 | Ajiro |
| 8,707,820 B2 | 4/2014 | Fujiwara |
| 8,726,654 B2 | 5/2014 | Cagnac et al. |
| 8,777,331 B2 | 7/2014 | Fukushima |
| 8,806,976 B1 | 8/2014 | Soltys et al. |
| 8,814,279 B2 | 8/2014 | Sekiya et al. |
| 8,833,072 B2 | 9/2014 | Sprocq et al. |
| 8,850,900 B2 | 10/2014 | Isono et al. |
| 8,874,343 B2 | 10/2014 | Anderson et al. |
| 8,893,579 B2 | 11/2014 | Fujiwara et al. |
| 8,931,368 B2 | 1/2015 | Fujiwara et al. |
| 8,944,528 B2 | 2/2015 | Pursifull et al. |
| 9,045,017 B2 | 6/2015 | Buettner et al. |
| 9,134,748 B2 | 9/2015 | Fujiwara |
| 9,162,655 B2 | 10/2015 | Murayama et al. |
| 9,221,338 B2 | 12/2015 | Gauthier |
| 9,254,829 B2 | 2/2016 | Jeon et al. |
| 9,260,088 B2 | 2/2016 | Shand et al. |
| 9,266,507 B2 | 2/2016 | Shand et al. |
| 9,340,193 B2 | 5/2016 | Ganzel |
| 9,399,462 B2 | 7/2016 | Awadi et al. |
| 9,403,516 B2 | 8/2016 | Strengert et al. |
| 9,442,030 B2 | 9/2016 | Fujiwara et al. |
| 9,465,402 B2 | 10/2016 | Kaiser |
| 9,501,083 B2 | 11/2016 | Zhou et al. |
| 9,505,385 B2 | 11/2016 | Yasui et al. |
| 9,539,993 B2 | 1/2017 | Crombez et al. |
| 9,566,964 B2 | 2/2017 | Jurgens |
| 9,580,056 B2 | 2/2017 | Ishino et al. |
| 9,582,025 B2 | 2/2017 | Jayasuriya et al. |
| 9,592,811 B2 | 3/2017 | Deng et al. |
| 9,616,861 B2 | 4/2017 | Soltys et al. |
| 9,631,918 B2 | 4/2017 | Weiberle et al. |
| 9,651,634 B2 | 5/2017 | Kang |
| 9,676,375 B2 | 6/2017 | Matsuoka et al. |
| 9,707,950 B2 | 7/2017 | Wessner et al. |
| 9,740,233 B2 | 8/2017 | Fujiwara et al. |
| 9,804,047 B2 | 10/2017 | Pagani et al. |
| 9,815,367 B2 | 11/2017 | Maruyama et al. |
| 9,821,776 B2 | 11/2017 | Mayer |
| 9,829,402 B2 | 11/2017 | Beason et al. |
| 9,845,085 B2 | 12/2017 | Besier et al. |
| 9,963,130 B2 | 5/2018 | Tsuchiya |
| 9,989,987 B2 | 6/2018 | Fujiwara |
| 10,081,340 B2 | 9/2018 | Szymczak |
| 10,086,806 B2 | 10/2018 | Pennala et al. |
| 10,112,587 B2 | 10/2018 | Richards et al. |
| 10,124,774 B2 | 11/2018 | Kitaguchi et al. |

(56) References Cited

U.S. PATENT DOCUMENTS

| | | |
|---|---|---|
| 10,137,870 B2 | 11/2018 | Decker et al. |
| 10,155,505 B2 | 12/2018 | Christoff et al. |
| 10,166,954 B2 | 1/2019 | Houtman et al. |
| 10,173,661 B2 | 1/2019 | Rifici et al. |
| 10,175,712 B2 | 1/2019 | Kaijala |
| 10,239,531 B2 | 3/2019 | Kilmurray et al. |
| 10,248,152 B2 | 4/2019 | Kim et al. |
| 10,296,036 B2 | 5/2019 | Cosby et al. |
| 10,296,037 B2 | 5/2019 | Henrikson |
| 10,343,657 B2 | 7/2019 | Street et al. |
| 10,351,117 B2 | 7/2019 | Isono |
| 10,421,447 B2 | 9/2019 | Leiber et al. |
| 10,507,811 B2 | 12/2019 | Tandler et al. |
| 10,525,959 B2 | 1/2020 | Knechtges et al. |
| 10,549,737 B2 | 2/2020 | Leiber et al. |
| 2001/0052727 A1 | 12/2001 | Betts |
| 2002/0108463 A1 | 8/2002 | Shaw et al. |
| 2002/0117893 A1 | 10/2002 | Shaw et al. |
| 2003/0090150 A1 | 5/2003 | Woo |
| 2004/0004393 A1 | 1/2004 | Richard |
| 2004/0040408 A1 | 3/2004 | Shaw et al. |
| 2004/0145322 A1 | 7/2004 | Trutschel et al. |
| 2004/0187625 A1 | 9/2004 | Schiel et al. |
| 2004/0251095 A1 | 12/2004 | Simard et al. |
| 2005/0082909 A1 | 4/2005 | Constantakis et al. |
| 2005/0217414 A1 | 10/2005 | Gibson |
| 2005/0223836 A1 | 10/2005 | Gibson |
| 2006/0027096 A1 | 2/2006 | Giering et al. |
| 2006/0064977 A1 | 3/2006 | Ohlig et al. |
| 2006/0185469 A1 | 8/2006 | Schlabach |
| 2006/0224284 A1 | 10/2006 | Ueno et al. |
| 2007/0068306 A1 | 3/2007 | Herrick et al. |
| 2007/0112473 A1 | 5/2007 | Ueno et al. |
| 2007/0159126 A1 | 7/2007 | Nobuyasu et al. |
| 2007/0193401 A1 | 8/2007 | Campbell |
| 2007/0296268 A1 | 12/2007 | Shaw et al. |
| 2008/0276749 A1 | 11/2008 | Stewart et al. |
| 2011/0041647 A1 | 2/2011 | Soltys |
| 2011/0143320 A1 | 6/2011 | McCormick et al. |
| 2013/0074634 A1 | 3/2013 | Al-Rubb |
| 2014/0060239 A1 | 3/2014 | Hemmege Venkatappa et al. |
| 2015/0001915 A1 | 1/2015 | Murayama et al. |
| 2015/0001917 A1 | 1/2015 | Murayama et al. |
| 2015/0001918 A1 | 1/2015 | Murayama et al. |
| 2016/0016569 A1 | 1/2016 | Odaira et al. |
| 2017/0001615 A1 | 1/2017 | Adler et al. |
| 2017/0067228 A1 | 3/2017 | Hagman |
| 2017/0225664 A1 | 8/2017 | Beever |
| 2017/0334344 A1 | 11/2017 | Salter et al. |
| 2017/0351291 A1 | 12/2017 | Schoenfuss et al. |
| 2018/0043866 A1 | 2/2018 | Monsere et al. |
| 2018/0056963 A1 | 3/2018 | Krueger et al. |
| 2018/0126966 A1 | 5/2018 | Crum |
| 2018/0141530 A1 | 5/2018 | Kilmurray et al. |
| 2018/0208163 A1 | 7/2018 | Lee et al. |
| 2018/0253121 A1 | 9/2018 | Stuart et al. |
| 2018/0257656 A1 | 9/2018 | Zhao et al. |
| 2018/0259407 A1 | 9/2018 | Hardy et al. |
| 2018/0283967 A1 | 10/2018 | Kato |
| 2018/0290640 A1 | 10/2018 | Johnson et al. |
| 2018/0370515 A1 | 11/2018 | Kim |
| 2018/0356853 A1 | 12/2018 | Suntharalingam |
| 2019/0092298 A1 | 3/2019 | Bach et al. |
| 2019/0100137 A1 | 4/2019 | Wolf-Monheim |
| 2019/0121385 A1 | 4/2019 | Lee |
| 2019/0271570 A1 | 9/2019 | Zhao et al. |
| 2019/0308597 A1 | 10/2019 | Seibert |
| 2019/0350757 A1 | 11/2019 | Charles |
| 2019/0359194 A1 | 11/2019 | Bindl et al. |
| 2020/0003300 A1 | 1/2020 | Yang |
| 2020/0025113 A1 | 1/2020 | Glugla et al. |

FOREIGN PATENT DOCUMENTS

| | | |
|---|---|---|
| DE | 19755481 A1 | 6/1999 |
| DE | 19825231 A1 | 12/1999 |
| DE | 19510522 C2 | 2/2000 |
| DE | 19836692 A1 | 2/2000 |
| DE | 10043255 A1 | 3/2002 |
| DE | 10341277 A1 | 3/2005 |
| DE | 10347838 A1 | 3/2005 |
| DE | 10347843 A1 | 4/2005 |
| DE | 102004023007 A1 | 12/2005 |
| DE | 102004041733 B4 | 7/2006 |
| DE | 102005033179 A1 | 1/2007 |
| DE | 202007000827 U1 | 4/2007 |
| DE | 1020006001683 A1 | 7/2007 |
| DE | 102007018962 A1 | 10/2008 |
| DE | 102007035326 A1 | 1/2009 |
| DE | 102010000882 A1 | 7/2010 |
| DE | 202010008405 U1 | 12/2010 |
| DE | 102009055251 A1 | 6/2011 |
| DE | 102010024735 A1 | 12/2011 |
| DE | 102011106396 A1 | 4/2012 |
| DE | 102010061439 A1 | 6/2012 |
| DE | 102011016239 A1 | 10/2012 |
| DE | 102011117264 A1 | 11/2012 |
| DE | 102012024846 A1 | 8/2013 |
| DE | 102013204778 A | 9/2013 |
| DE | 102012106213 A1 | 1/2014 |
| DE | 102013106654 A1 | 1/2015 |
| DE | 102016201784 A1 | 9/2016 |
| DE | 202016106697 U1 | 3/2017 |
| DE | 102004013868 B4 | 8/2017 |
| DE | 102016212931 A1 | 1/2018 |
| DE | 102007047547 B4 | 2/2018 |
| DE | 102016116619 A1 | 3/2018 |
| DE | 102016219219 A1 | 4/2018 |
| DE | 102018100072 A1 | 8/2018 |
| DE | 102017104278 A1 | 9/2018 |
| DE | 102017004518 A1 | 11/2018 |
| DE | 102017211955 A1 | 1/2019 |
| DE | 102017218384 A1 | 4/2019 |
| DE | 102016219622 B4 | 6/2019 |
| DE | 112017004866 T5 | 6/2019 |
| DE | 102008026751 B4 | 3/2020 |
| EP | 0136689 A2 | 4/1985 |
| EP | 0136690 A2 | 4/1985 |
| EP | 0301018 B1 | 6/1992 |
| EP | 0786387 A2 | 7/1997 |
| EP | 1055912 A2 | 11/2000 |
| EP | 1577184 A2 | 9/2005 |
| EP | 1078833 B1 | 11/2005 |
| EP | 1394007 B1 | 8/2007 |
| EP | 1654137 B1 | 10/2008 |
| EP | 1781516 B1 | 6/2010 |
| EP | 2806255 A2 | 11/2014 |
| EP | 2818444 A1 | 12/2014 |
| EP | 2871102 A1 | 5/2015 |
| EP | 2879924 A1 | 6/2015 |
| EP | 2826680 B1 | 2/2016 |
| EP | 3213168 B1 | 7/2018 |
| EP | 2731838 B1 | 9/2018 |
| EP | 3375678 B1 | 2/2020 |
| EP | 2926090 B1 | 3/2020 |
| GB | 2451559 A | 2/2009 |
| JP | H08150263 A | 6/1996 |
| WO | 2001001066 A1 | 1/2001 |
| WO | 2001040038 A1 | 6/2001 |
| WO | WO-0140038 A1 * | 6/2001 ............. B60T 7/042 |
| WO | 20160186979 A1 | 11/2016 |
| WO | 2018029472 A1 | 2/2018 |
| WO | 20180104740 A1 | 6/2018 |

OTHER PUBLICATIONS

Chinese Patent Office Action with Search Report for Application No. 202080033525.9 dated Jul. 15, 2023 (9 pages, along with statement of relevance).

(56) References Cited

OTHER PUBLICATIONS ams: New Magnetic Position Sensors for automotive applications Support Full ISO26262 Compliance and Provide SysteminPackage (SiP) Format. Business Wire-2016; https://dialog.proquest.com/professional/docview/1784083696/15CC904FA1C11CA0C95/123?accountid=157282.

International Search Report and Written Opinion for Application No. PCT/US2020/031633 dated Jul. 21, 2020 (13 pages).

International Preliminary Report on Patentability and Written Opinion for Application No. PCT/US2020/031633 dated Nov. 2, 2021 (9 pages).

\* cited by examiner

VEHICLE BRAKE PEDAL WITH PEDAL RESISTANCE ASSEMBLY AND FORCE/POSITION SENSOR

CROSS-REFERENCE TO RELATED APPLICATIONS

This patent application claims priority and benefit of U.S. Provisional Patent Application Ser. No. 62/845,401 filed on May 9, 2019 and U.S. Provisional Patent Application Ser. No. 62/992,944 filed on Mar. 21, 2020, the disclosure and contents of which are expressly incorporated herein in their entireties by reference.

This patent application is also a divisional application which claims priority and benefit of U.S. application Ser. No. 16/867,733 filed on May 6, 2020 which is a continuation-in-part application of U.S. application Ser. No. 16/439,822 filed on Jun. 13, 2019, now U.S. Pat. No. 10,654,452 issued on May 19, 2020, which is a continuation application of U.S. application Ser. No. 15/876,772 filed on Jan. 22, 2018, now U.S. Pat. No. 10,343,657 issued on Jul. 9, 2019, the disclosures and contents of which are expressly incorporated herein in their entireties by reference.

FIELD

This invention relates to a vehicle brake pedal with a pedal resistance assembly and a force/position sensor.

BACKGROUND

Brake-by-wire vehicle brake pedals do not utilize a conventional vacuum or hydraulic system for braking.

There is a desire to replicate the feel of a conventional vacuum or hydraulic braking system in brake-by-wire vehicle brake pedals.

The present invention is directed to a brake-by-wire vehicle brake pedal including a pedal resistance assembly that replicates the resistance feel of a conventional vacuum or hydraulic braking system.

The present invention is also directed to a pedal resistance assembly that incorporates a pedal force/position sensor.

SUMMARY

The present invention is generally directed to a brake pedal assembly comprising a pedal and a pedal resistance force member operably coupled to the pedal and including a damper pedal resistance force module defining an interior fluid-filled cavity, a shaft extending through the damper module and including a piston mounted thereon and moveable through the fluid-filled cavity to generate a damper resistance force, a spring pedal resistance force module adapted to generate a spring pedal resistance force, a pedal force sensing module mounted to the pedal resistance force member, a pedal position sensor mounted to the pedal resistance force member; and a pedal force sensor mounted to the pedal resistance force member.

In one embodiment, the spring pedal resistance force module and the pedal force sensing modules are located at opposed ends of the pedal resistance force member.

In one embodiment, the spring pedal resistance force module and the pedal force sensing modules are located at the same end of the pedal resistance force member.

In one embodiment, the pedal resistance force member includes a moveable sleeve and a fixed sleeve, the moveable sleeve moving in response to the movement of the pedal, the shaft being operably coupled to the moveable sleeve and moveable in response to the movement of the moveable sleeve, the spring pedal resistance force module being coupled to the fixed sleeve and including first and second springs compressible in response to movement and contact with the shaft and the fixed sleeve respectively for generating the spring pedal resistance force.

In one embodiment, the pedal force sensing module is coupled to the moveable sleeve.

In one embodiment, the pedal resistance force member includes a moveable sleeve and a fixed sleeve, the moveable sleeve moving in response to the movement of the pedal, the shaft being operably coupled to the moveable sleeve and moveable in response to the movement of the moveable sleeve, the spring pedal resistance force module being coupled to the moveable sleeve and including a first spring compressible in response to movement of the moveable sleeve for generating the spring pedal resistance force.

In one embodiment, the pedal force sensing module is coupled to the moveable sleeve.

In one embodiment, the pedal force sensing module includes a deflectable strain gauge plate with a deformable strain gauge element, the strain gauge plate being deflectable and the strain gauge element being deformable in response to the application of a force against the strain gauge plate.

In one embodiment, a bracket is coupled to the pedal and extending into the pedal force sensing module and into contact with the deflectable strain gauge, the bracket being adapted to exert a force against the deflectable strain gauge in response to the movement of the pedal.

In one embodiment, a magnet is coupled to the stationary sleeve, the pedal position sensor comprising a Hall Effect sensor mounted to the moveable sleeve and adapted for sensing changes in the magnetic field generated by the magnet for determining the position of the pedal in response to the movement of the Hall Effect sensor relative to the magnet.

The present invention is also directed to a pedal resistance force member for a brake pedal and comprising a damper pedal resistance force module defining an interior fluid-filled cavity, a shaft extending through the damper module and including a piston mounted thereon and moveable through the fluid-filled cavity to generate a damper resistance force, a spring pedal resistance force module adapted to generate a spring pedal resistance force, a pedal force sensing module mounted to the pedal resistance force member, a pedal position sensor mounted to the pedal resistance force member, and a pedal force sensor mounted to the pedal resistance force member.

In one embodiment, the spring pedal resistance force module and the pedal force sensing modules are located at opposed ends of the pedal resistance force member.

In one embodiment, the spring pedal resistance force module and the pedal force sensing modules are located at the same end of the pedal resistance force member.

In one embodiment, the pedal resistance force member includes a moveable sleeve and a fixed sleeve, the moveable sleeve moving in response to the movement of the pedal, the shaft being operably coupled to the moveable sleeve and moveable in response to the movement of the moveable sleeve, the spring pedal resistance force module being coupled to the fixed sleeve and including first and second springs compressible in response to movement and contact with the shaft and the fixed sleeve respectively for generating the spring pedal resistance force.

In one embodiment, the pedal force sensing module is coupled to the moveable sleeve.

In one embodiment, the pedal resistance force member includes a moveable sleeve and a fixed sleeve, the moveable sleeve moving in response to the movement of the pedal, the shaft being operably coupled to the moveable sleeve and moveable in response to the movement of the moveable sleeve, the spring pedal resistance force module being coupled to the moveable sleeve and including a first spring compressible in response to movement of the moveable sleeve for generating the spring pedal resistance force.

In one embodiment, the pedal force sensing module is coupled to the moveable sleeve.

In one embodiment, the pedal force sensing module includes a deflectable strain gauge plate with a deformable strain gauge element, the strain gauge plate being deflectable and the strain gauge element being deformable in response to the application of a force against the strain gauge plate.

In one embodiment, a bracket is coupled to a pedal and extends into the pedal force sensing module and into contact with the deflectable strain gauge, the bracket being adapted to exert a force against the deflectable strain gauge in response to the movement of the pedal.

In one embodiment, a magnet is coupled to the stationary sleeve, the pedal position sensor comprising a Hall Effect sensor mounted to the moveable sleeve and adapted for sensing changes in the magnetic field generated by the magnet for determining the position of the pedal in response to the movement of the Hall Effect sensor relative to the magnet.

Other advantages and features of the present invention will be more readily apparent from the following detailed description of the embodiment of the invention, the accompanying drawings, and the appended claims.

BRIEF DESCRIPTION OF THE DRAWINGS

These and other features can best be understood by the description of the accompanying FIGS as follows.

DESCRIPTION OF THE EMBODIMENTS

Figure 1:
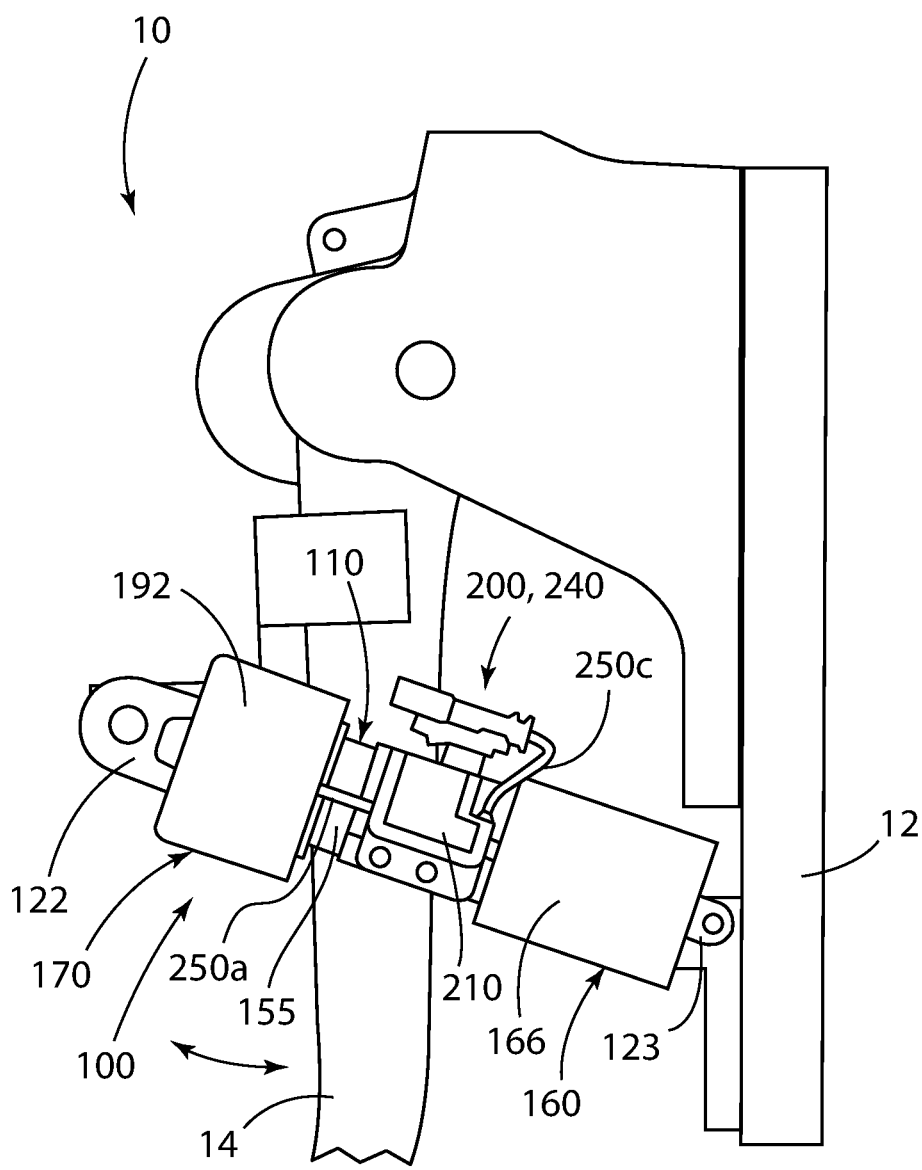
FIG. 1 is a simplified broken side elevational view of a vehicle brake pedal incorporating a first embodiment of a pedal resistance force assembly or member in accordance with the present invention.
Figure 2:
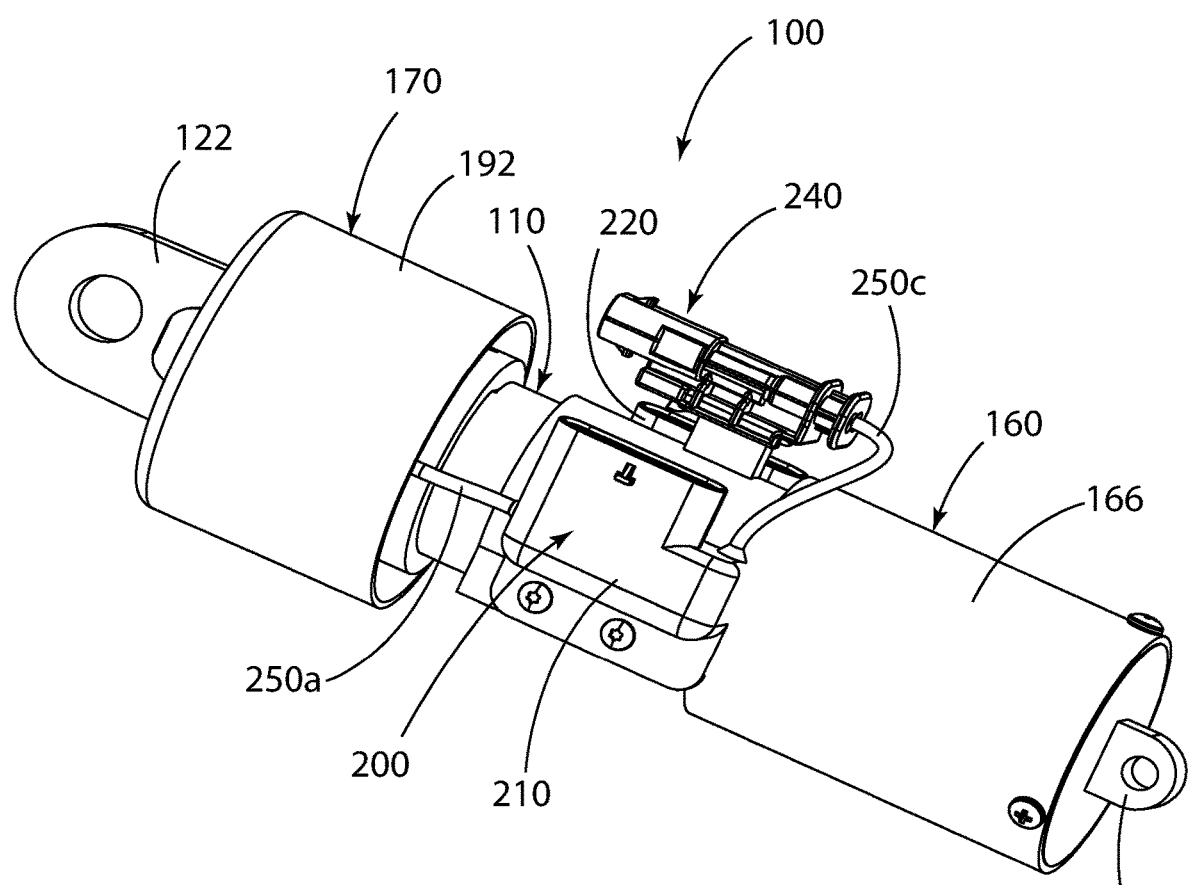
FIG. 2 is a perspective view of the pedal resistance force assembly shown in FIG. 1.

FIGS. 1-7 depict a first embodiment of a vehicle brake pedal assembly 10 incorporating a pedal resistance force assembly or module or member 100 in accordance with the present invention.

The vehicle brake pedal assembly 10 includes a base/bracket 12, an elongate brake pedal 14 pivotally connected for clockwise/engaging/braking and counterclockwise/disengaging/non-braking rotation and movement relative to the pedal base/bracket 12. The pedal resistance force assembly 100 is operably coupled to the pedal assembly 10 in a relationship extending between the base/bracket 12 and the pedal 14 and further in a relationship with a first end bracket 122 thereof operatively coupled to the pedal 14 and a second opposed end bracket 123 coupled to the pedal base/bracket 12.

The pedal resistance assembly 100 is generally in the form and shape of an elongate hollow cylinder or housing or tube initially comprising an interior liquid-filled cylinder or tubular damper or resistance force module 110 adapted to provide a velocity-dependent force response and including a first central generally cylindrical elongate hollow interior cylinder or tubular housing or sleeve 130 including an exterior circumferential wall 132 defining and forming an interior hollow elongate cylindrically or tubular shaped receptacle or cavity or chamber 134 and further defining opposed ends 131 and 133.

A first sealing cap or cartridge 112 covers and seals a first end of the sleeve 130 of the damper module 110. A second opposed and spaced apart sealing cap or cartridge 114 covers and seals a second opposed end of the sleeve 130 of the damper module 110. The cavity or chamber 134 contains a damper fluid (not shown) which, in one embodiment, can be a propylene glycol and water mixture.

The pedal resistance assembly 100 further comprises an elongate shaft 140 extending through the interior of the chamber 134 of the sleeve 130 of the damper module 110. The shaft 140 includes a first end 140a extending through a central aperture defined in the cap 112 and a second opposed end 140b of the shaft 140 extending through a central aperture defined in the opposed cap 114.

A piston 146 extends around a central portion or segment of the shaft 140 and is located in the fluid cavity 134 between the two end sealing caps 112 and 114. The piston 146 is fixed on the shaft 140 and is moveable linearly in the interior of the fluid cavity 134 in response to the back and forth linear movement of the shaft 140.

The piston 146 includes a dual rod structure adapted to maintain a constant fluid volume during the stroke or movement thereof. The interior surface of the wall 132 of the sleeve 130 of the damper module 110 includes variable geometry grooves 128 that allow the damping function to vary with distance or movement of the piston linearly within the interior of the sleeve 130. The pedal resistance assembly 100 still further comprises a second hollow cylindrical or tubular sleeve or housing 153 surrounding the sleeve 130 of the damper module 110. The end 140b of the shaft 140 extends into the interior of the sleeve or housing 153. The sleeve 153 includes opposed ends 153a and 153b. The damper module sleeve 130 is located in the end 153a of the sleeve 130.

A pair of elongate sensor magnets 154a and 154b are mounted on a magnet carrier 300 surrounding and fixed to the end 153a of the sleeve 153. The magnets 154a and 154b are located in a diametrically opposed relationship on opposed sides of the magnet carrier 300 and thus on diametrically opposed sides of the pedal resistance assembly 110.

A third hollow cylindrical or tubular sleeve or guide 155 surrounds the second sleeve or housing 153. The sleeve or guide 155 includes opposed ends 155a and 155b. A collar 156 is defined at the one end 155a of the sleeve or guide 155. The end 140a of the shaft 140 extends through a central aperture defined in the collar 156.

A ring 159 surrounds and is fixed to the end 155b of the sleeve or guide 155.

The pedal resistance assembly 100 still further comprises a spring pedal resistance force module 160 at one end thereof that is coupled to and surrounds the end 153b of the sleeve 153. The pedal resistance module 160 includes the bracket 123 which includes an interior cylindrical collar 162 surrounding the end 153b of the sleeve 153 and a cylindrical pin or projection or finger 163 extending into the interior of the end 153b of the sleeve 153. The pedal resistance module 160 further includes an interior cap 163a that is moveable within the interior of the end 153b of the sleeve 153. A ring 157 protruding inwardly from the interior face of the wall of the sleeve 153 defines a stop that limits the movement of the cap 163a in the interior of the sleeve 153.

A first compressible and expandable helical spring 164 extends around the pin 163, is located in the interior of the end 153a of the sleeve 153 and includes opposed ends abutted against the interior collar 162 and the interior of the bracket 123 respectively.

A second compressible and expandable helical spring 165 extends around the exterior of the end 153b of the sleeve 153 and includes opposed ends abutted respectively against the collar 162 of the bracket 123 and the ring 159 surrounding and fixed to the end 155b of the sleeve or guide 155.

An exterior shroud 166 surrounds and covers the spring 165. A screw 167 secures the shroud 166 to the bracket 123.

The pedal resistance assembly 100 still further comprises a pedal force module 170 coupled to and partially surrounding the collar 156 at the one end 155a of the sleeve or guide 155.

Thus, in the embodiment shown, the pedal resistance module 160 and the pedal force module 170 are positioned in a co-linear relationship along the longitudinal axis of the pedal resistance assembly 100 and located at opposed distal ends of the pedal resistance assembly 100 in a relationship with the damper or resistance force module 110 located between the pedal resistance module 160 and the pedal force module 170, all in a co-linear relationship relative to each other.

The pedal force module 170 includes an interior strain gauge housing 172 that includes a center plate 173 and a circumferential collar 174 surrounding the collar 156 of the sleeve or guide 155. An elongate spring pin 176 extends through the collars 174 and 156 and the end 140a of the shaft 140. The housing 172 defines an interior chamber or cavity or receptacle for a pair of deformable Wheatstone bridge strain gauge discs 180 and 182 separated by a spacer 184 and including strain gauge elements (not shown) mounted thereon as known in the art.

The bracket 122 includes a pin 188 that extends through the strain gauge discs 180 and 182 and through an aperture defined in the center plate 173 of the housing 172. A preload lock nut 190 surrounds the end of the pin 188, is abutted against the plate 173, and secures the pin 188 and thus the bracket 122 to the housing 172. A shroud 192 surrounds the housing 172.

Figure 3:
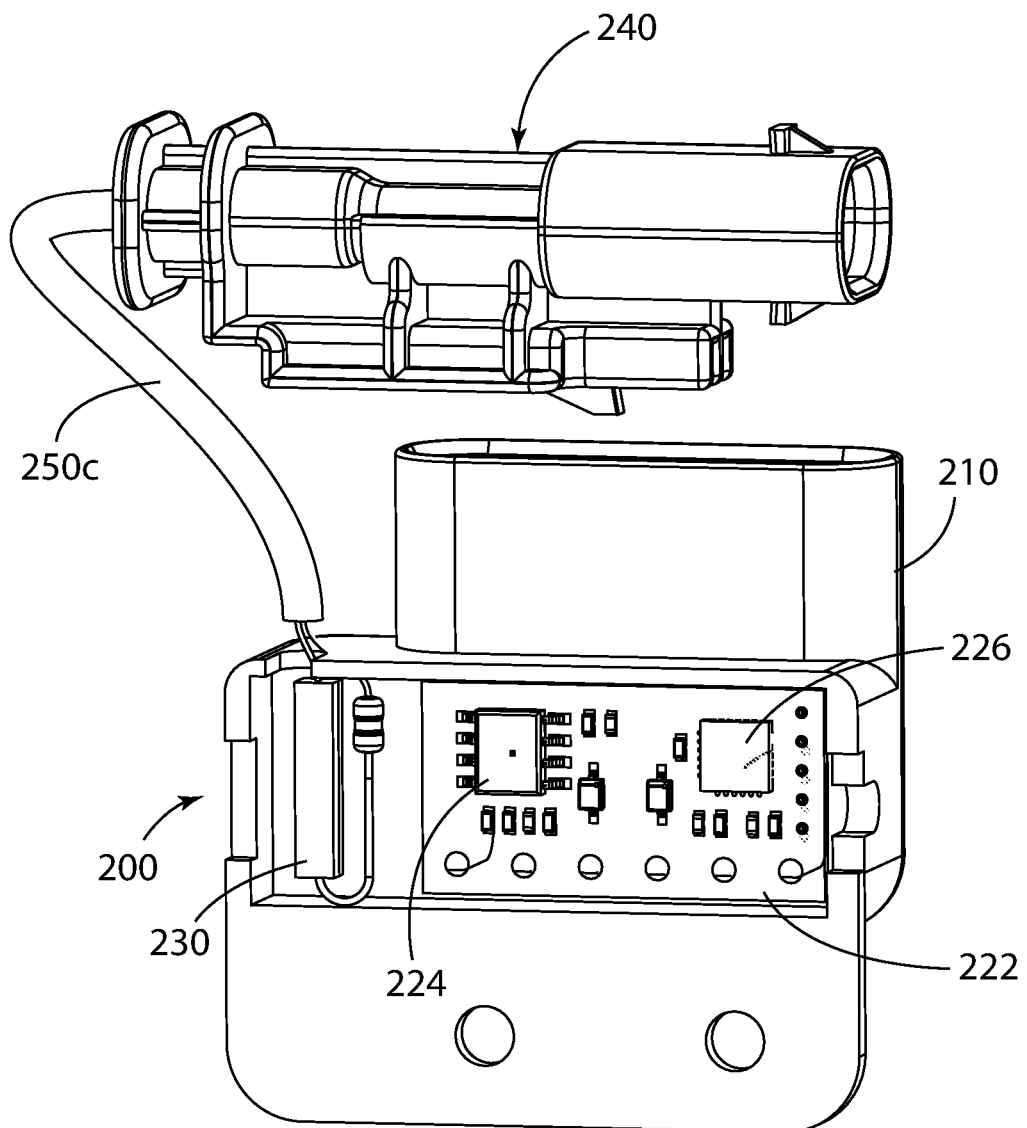
FIG. 3 is a perspective view of one of the connectors with the position and force sensor assembly and associated sensor integrated circuits and wake-up switch.
Figure 4:
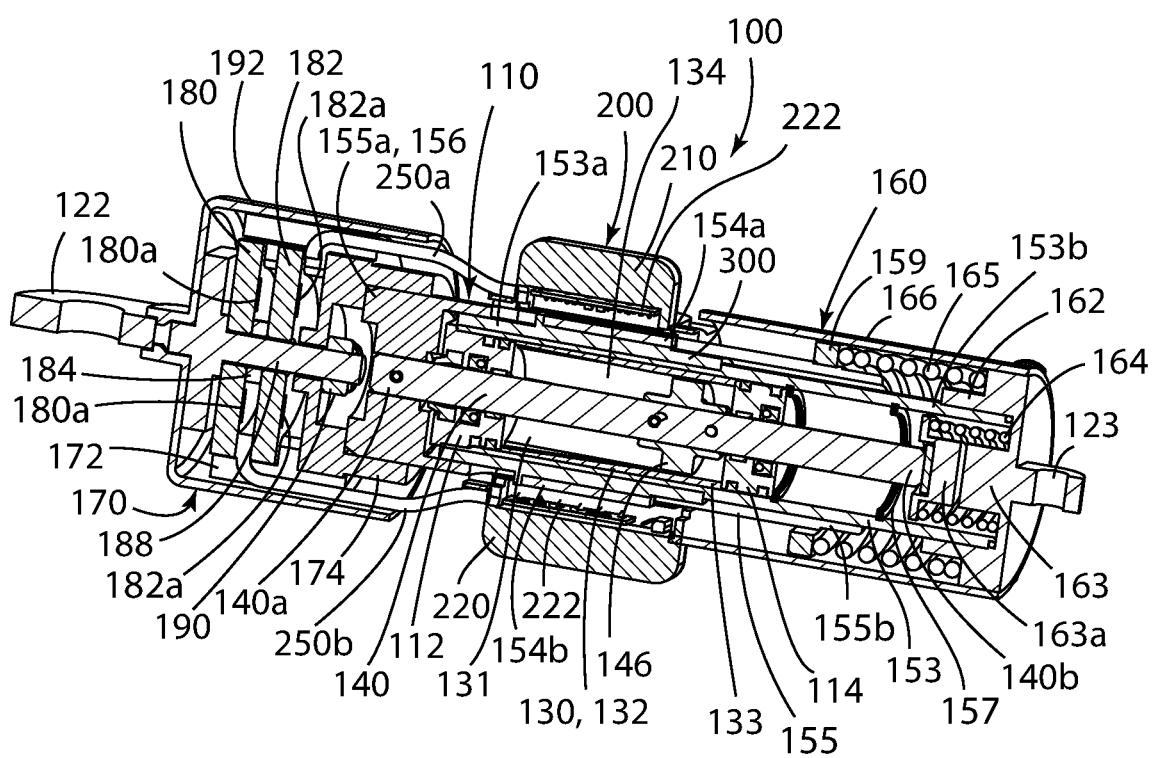
FIGS. 4 and 7 are vertical cross-sectional views of the pedal resistance force assembly shown in FIG. 2 in its fully engaged braking position.
Figure 5:
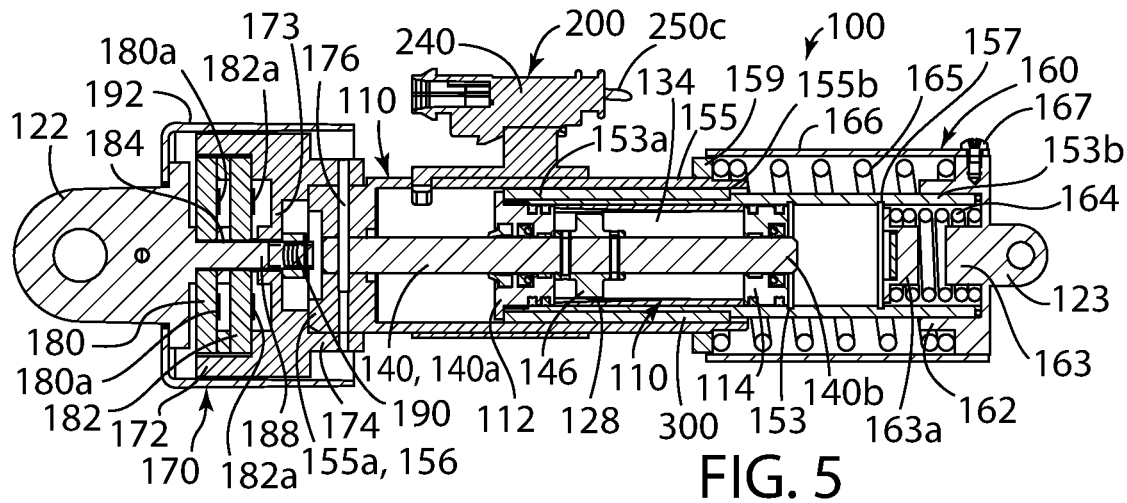
FIG. 5 is a vertical cross-sectional view of the pedal resistance force assembly shown in FIG. 2 in its rest or disengaged or non-braking position.

The pedal resistance assembly 100 still further comprises a combination position and force sensor/sensing assembly or module 200 coupled to the exterior of the damper module 110 and, more specifically, to the exterior of the guide sleeve 155 of the damper module 110. The assembly 200 comprises a pair of diametrically opposed connector assemblies 210 and 220 mounted to the exterior of the guide sleeve 155. As shown in FIG. 3, each of the connector assemblies 210 and 220 defines an interior housing for a printed circuit board 222 including a position sensor Hall Effect IC 224 and a pedal force sensor IC 226 mounted thereon. The pedal resistance assembly 110 includes a pair of connector assemblies 210 and 220 and position sensor Hall Effect ICs and the pair of magnets 154a and 154b for redundancy reasons.

The connector assembly 210 also defines a housing for a position sensor wake-up switch 230 which, in one embodiment, may be a Reed type switch. The switch 230 is adapted to wake-up the respective position sensor Hall Effect ICs 224 in response to the application of an initial braking force against the pedal 14.

A switch connector assembly 240 is also mounted to the exterior of the damper module 110 and, more specifically, to exterior of the sleeve 155 of the damper module 110.

Connector wires 250a and 250b extend between the respective strain gauge elements 180 and 182 and the respective strain gauge sensor ICs 226 mounted on the respective printed circuit boards 222 in the interior of the respective connector assemblies 210 and 220. Another connector wire 250c extends between the wake-up switch 230 and the switch connector assembly 240.

Figure 8:
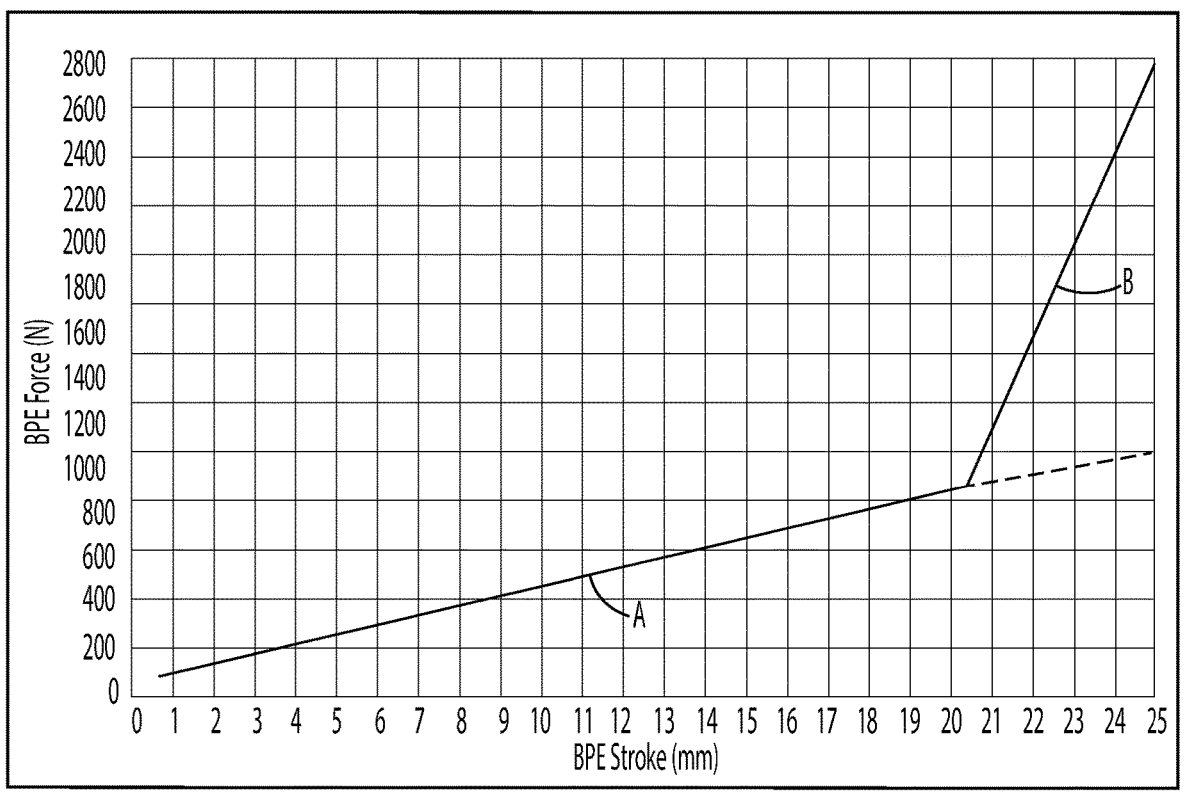
FIG. 8 is a graph depicting the pedal resistance force generated by the pedal resistance assembly shown in FIGS. 1-7 as a function of pedal travel.

The combination of the pedal damper module 110 and the pedal resistance module 160 respectively are adapted to create and generate an increasing resistive force on the pedal 14 in response to the travel or movement or stroke of the pedal 14 during operation of a vehicle for either applying the brakes and increasing the resistance force or releasing the brakes and decreasing the resistance force as represented by the lines A and B in the graph of FIG. 8.

Figure 6:
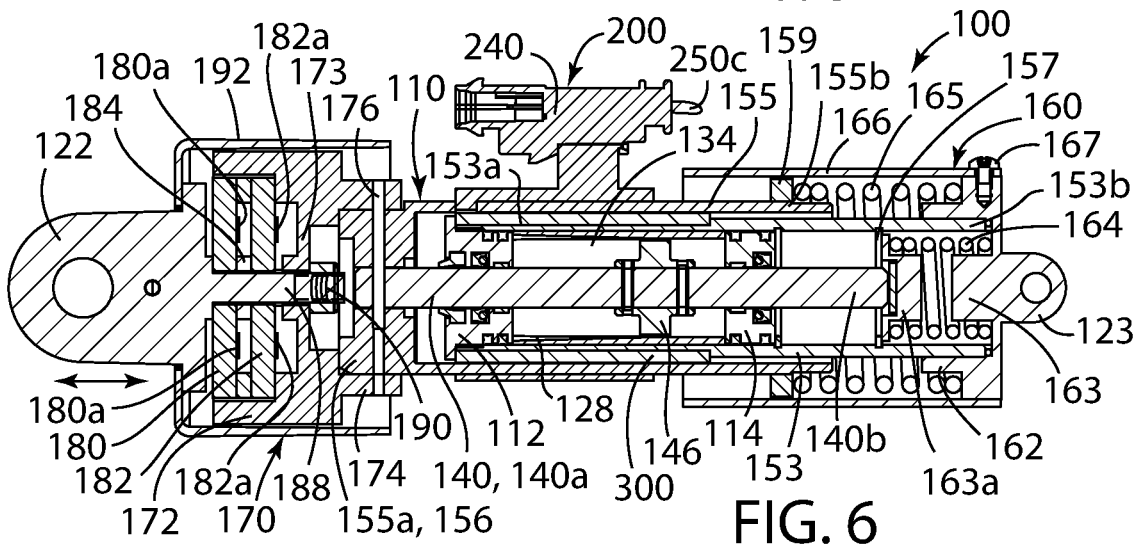
FIG. 6 is a vertical cross-sectional view of the pedal resistance force assembly shown in FIG. 2 in a first partially engaged braking position.
Figure 7:
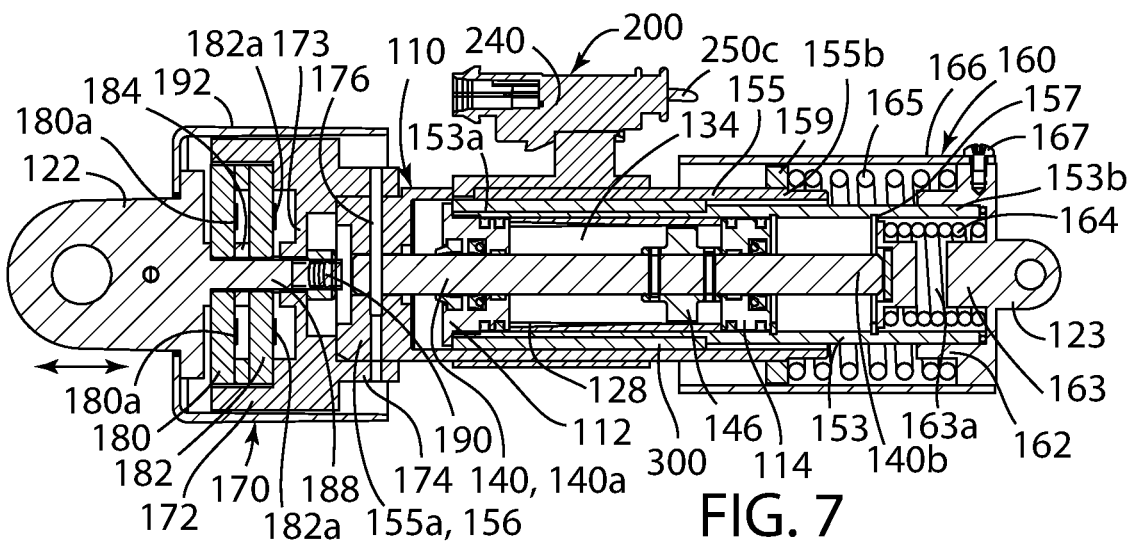

The combination of the damper module 110 and the spring 165 of the spring resistance module 160 create and generate an initial increasing resistance or feel force on the brake pedal 14 that is represented by the point A in the graph of FIG. 8. This initial increasing resistance or feel force is generated in response to the depression of the pedal 14 which, as shown in FIG. 6, results in the forward movement of the bracket 122 which in turn results in the forward movement of the force module 170 which in turn results in the forward sliding movement relative to the sleeve 130 of the damper module 110 and the sleeve 153 which in return results in the forward sliding movement of the shaft 140 coupled to the sleeve 155 which in return results in the movement of the piston 146 in the interior fluid filled cavity 134 of the damper module 110 which in return generates the initial increasing dampening resistive force against the pedal 14.

An additional resistive force is generated against the pedal 14 as a result of the compression of the spring 165 in response to the forward sliding movement of the sleeve 155 which results in the forward movement of the ring 159 mounted thereon which causes the application of a compressive force against the one end of the spring 165 abutted against the ring 159 which in turn results in the compression of the spring 165 and the generation of a resistive force against the pedal 14.

The additional depression of the pedal 14 results in the additional forward movement of the sleeve 155 and the shaft 140 which results in the additional compression of the spring 165 and still further results in the abutting contact of the end 140*b* of the shaft 140 with the cap 163*a* which in turn and as a result of the further forward movement of the sleeve 155 and the shaft 140 results in the forward movement of the cap 163*a* which in turn results in the compression of the spring 164 which results in the generation of a still further increased resistive force against the pedal 14 which is represented by the line B in the graph of FIG. 8.

Although not described or shown herein in detail, it is understood that the lines B and A also represent the decreased pedal resistance force on the pedal 14 generated when the vehicle operator removes foot pressure from the pedal 14 to release the brakes of the vehicle.

Additionally, the forward movement of the sleeve 155 results in the forward movement of the connector assemblies 210 and 220 mounted thereon and thus the movement of the position sensor Hall Effect ICs 224 mounted on the respective printed circuit boards 222 thereof relative to the respective stationary magnets 154*a* and 154*b* on the magnet carrier 300 which results in the sensing by the respective Hall Effect ICs 224 of the changes in the magnitude and/or direction of the magnetic fields of the respective magnets 154*a* and 154*b* which results in the generation of respective electrical signals which are transferred to a control unit (not shown) for measuring and determining the position of the sleeve 155 and thus the position of the pedal 14.

The forward movement of the connector assembly 210 also results in the movement of the reed switch 230 which in turn results in the activation of the switch 230 which in turn results in the wake-up of the respective position sensor ICs 224 upon initial depression of the pedal 14.

Moreover, the depression of the pedal 14 results in the forward movement of the bracket 122 which in turn results in the bracket 122 applying a force against the respective strain gauge discs 180 and 182 which in return results in a deformation or deflection of the respective discs 180 and 182 that is sensed by one or more strain gauge elements 180*a* and 182*a* located on one or both of the exterior surfaces of the discs 180 and 182 which results in a change of voltage that is sensed by the respective strain gauge elements 180*a* and 182*a* and the generation of appropriate electric signals which are transferred to the pedal force sensor IC 224 on the respective printed circuit board assemblies 222 of the respective connector assemblies 210 and 220 which signals are transferred to a control unit (not shown) for measuring and determining the force being applied to the pedal 14. The pedal resistance assembly 100 includes a pair of force sensor assemblies for redundancy reasons.

FIGS. 9-19 depict a second embodiment of a vehicle brake pedal assembly 1010 incorporating a pedal resistance force assembly or module or member 1100 in accordance with the present invention.

The vehicle brake pedal assembly 1010 includes a base/bracket 1012, an elongate brake pedal 1014 pivotally connected for clockwise/engaging/braking and counterclockwise/disengaging/non-braking rotation and movement relative to the pedal base/bracket 1012. The pedal resistance assembly 1100 is operably coupled to the pedal assembly 1010 in a relationship extending between the base/bracket 1012 and the pedal 1014 and more specifically in a relationship with a first end bracket 1122 thereof operatively coupled to the pedal 1014 and a second opposed end bracket 1123 coupled to the pedal base/bracket 1012.

The pedal resistance assembly 1100 which is generally in the form and shape of an elongate hollow cylinder or housing or tube initially comprising a fixed or stationary liquid and air filled damper pedal resistance force module 1110 adapted to provide a velocity-dependent force response and including a first central generally cylindrical elongate hollow interior housing or sleeve or tube 1130 including an interior circumferential wall 1132 defining and forming an interior hollow elongate cylindrically shaped receptacle or cavity or chamber 1134 and further defining opposed ends 1131 and 1133.

The housing or sleeve 1130, and more specifically, the circumferential wall 1132 thereof, also includes a plurality, and more specifically in the embodiment shown three, spaced apart through-holes or apertures 1132*a*, 1132*b*, and 1133*c* extending around the circumference of the wall 1132 and are radially spaced along the length of the wall 1132.

The housing or sleeve 1130, and more specifically the circumferential wall 1132 thereof, also includes and defines a circumferential exterior recessed area or groove 1132*d* in communication with the respective holes or apertures 1132*a*, 1132*b*, and 1133*c*.

A first sealing cap or cartridge 1112 covers and seals the first end 1131 of the sleeve 1130 of the damper module 1110. A second opposed and spaced apart cap or cartridge 1114 covers and seals the second end 1133 of the sleeve 1130 of the damper module 1110. The bracket 1123 is unitary with the cap 1114.

The cavity or chamber 1134 includes an interior moveable generally cylindrical sealing plug or gasket or floating tan piston 1120 that separates the interior of the cavity or chamber 1134 into a first chamber section 1134*a* on one side of the plug or gasket 1120 that contains a damper fluid which, in one embodiment, can be a propylene glycol and water mixture and a second chamber section 1134*b* on the other side of the plug or gasket or piston 1120 that contains compressed air.

The cap or cartridge 1114 incorporates a Schrader or the like air pressure valve 1116 adapted for connection to a source of compressed air. The valve 1116 is in communication with an aperture or conduit 1117 defined in the interior of the cap or cartridge 1114 which, in turn, is in communication with the interior of the second chamber section 1134b and adapted for the supply of compressed air into the interior of the second chamber section 1134b as discussed in more detail below.

The pedal resistance assembly 1100 further comprises an elongate shaft 140 extending through the interior of the chamber 1134 of the damper or resistance force module 1110, and more specifically through the interior of the chamber section 1134a of the sleeve 1130 of the damper module 1110. The shaft 1140 includes a first end 1140a and an opposed second end 1140b.

A piston 1146 extends around the first end 1140a of the shaft 1140 and is located in the fluid cavity section 1134a of the interior chamber 1134 between the sealing cap 1112 and the sealing gasket or plug 1120. The piston 1146 is fixed on the shaft 1140 and is moveable linearly in the interior of the fluid cavity section 1134a of the chamber 1134 in response to the back and forth linear movement of the shaft 140 as explained in more detail below.

The piston 1146 includes a plurality of check valves 1147 incorporated therein and extending between opposed sides of the piston 1146 and adapted to allow the liquid in the first chamber section 1134a to move between the opposed sides of the piston 1146 as also described in more detail below.

The pedal resistance assembly 1100 and, more specifically the damper pedal resistance force module 1110 thereof, still further comprises a second hollow cylindrical or tubular stationary or fixed sleeve or housing 1153 surrounding and fixed to the exterior of the circumferential wall 1132 of the sleeve 1130 of the damper module 1110. The sleeve or housing 1153 includes opposed ends 1153a and 1153b. The end 1153a of the sleeve 1153 extends and protrudes fore of the end 1131 of the sleeve 1130. The end 1153b of the sleeve 1153 surrounds the end 1133 of the sleeve 1130. The cap 1114 surrounds and is fixed to the end 1153b of the sleeve 1153.

The end 1153a of the sleeve 1153 surrounds the first sealing cap or cartridge 1112 which covers and seals the first end 1131 of the sleeve 1130 of the damper module 1110.

The sleeve 1153 surrounds and is fixed to the sleeve 1130 in a relationship wherein the groove 1133d defined in the sleeve 1130 and the interior surface of the wall of the sleeve 1153 defines a fluid flow chamber as described in more detail below.

A pair of elongate and diametrically opposed sensor magnets 1154a and 1154b are located in respective grooves defined in the exterior face of the wall of the sleeve 1153. A switch magnet 1154c is located in another groove defined in the exterior wall of the sleeve 1153. The switch magnet 1154c is positioned on the sleeve 1153 between and spaced ninety degrees from the sensor magnets 1154a and 1154b.

The pedal resistance assembly 1100 still further comprises a spring pedal resistance force module 1160 defined by a moveable and slidable sleeve 1161 including a first end 1161a surrounding the end 1153a of the sleeve 1153 of the damper or resistance force module 1110. The sleeve 1160 defines an opposed end or radial collar or base 1161b. The sleeve 1161 also defines an interior chamber or cavity 1162.

A compressible and expandable helical spring 1164 is located in the interior chamber or cavity 1162. A first end of the spring 1164 is abutted against the end of the interior cap 1112. A second end of the spring 1164 is abutted against a face of the collar 1160b of the sleeve 1161. The spring 1164 is compressible in response to the depression of the pedal 1014 and the resultant movement of the sleeves 1161 and 1153 relative to each other as described in more detail below.

The end 1140b of the shaft 1140 extends and is fixed in the end or collar 1160b of the sleeve 1161.

The pedal resistance assembly 1100 still further comprises a pedal force module 1170 coupled to and partially surrounding the end 1160b of the sleeve 1161.

The pedal force module 1170 includes an exterior collar or circumferential wall or jacket 1171 defining an interior hollow housing or cavity 1178 that houses a deformable Wheatstone bridge strain gauge disc 1180 including strain gauge elements (not shown) mounted thereon as known in the art.

The pedal force module 1170 further comprises an interior bracket 1174 located in the cavity 1178 and coupled to and abutted against the collar 1160b of the sleeve 1161.

An elongate pin 1176 extends successively through the end 1140b of the shaft 1140, the collar 1160b of the sleeve 1160, and the bracket 1174 of the pedal force module 1170.

The bracket 1122 is coupled to and extends into the interior of the collar 1171 of the pedal force module 1170. The bracket 1122 includes an outwardly projecting pin 1188 that extends from the bracket 1122 into the interior of the collar 1171, through the strain gauge disc 1180, and into the interior bracket 1174. A preload lock nut 1190 surrounds and is coupled to the distal end of the pin 1188 and secures the pin 1188 to the bracket 1174.

Thus, in the embodiment shown, the pedal resistance module 1160 and the pedal force module 1170 are positioned in a co-linear relationship along the longitudinal axis of the pedal resistance assembly 1100 and located at the same distal end of the pedal resistance assembly 1100 in an adjoining side-by side co-linear relationship with the pedal resistance module 1160 in an adjoining side-by-side co-linear relationship with the damper module 1110 and, still more specifically, in a side-by-side co-linear relationship with the pedal resistance module 1160 located between the pedal force module 1170 and the damper module 1110 of the pedal resistance assembly 1100.

The pedal resistance assembly 1100 still further comprises a combination position and force sensor assembly 1200 coupled to the exterior of the pedal resistance module 1160 and, more specifically, to the exterior of the sleeve 1161 of the pedal resistance module 1160 and more specifically comprises a plurality, and more specifically three, connector assemblies 1210, 1220, and 1230 mounted to the exterior of the sleeve 1161.

Each of the connector assemblies 1210 and 1220 defines a housing for a printed circuit board 1222 including a position sensor Hall Effect IC 1224 and a pedal force sensor IC 1226 mounted thereon. The pedal resistance assembly 1110 includes a pair of connector assemblies 1210 and 1220 and position sensor Hall Effect ICs and the pair of magnets 1154a and 1154b for redundancy reasons.

The connector assembly 1230 defines a housing for a position sensor wake-up switch 1232 which, in one embodiment, may be a Reed type switch. The switch 1232 is adapted to wake-up the respective position sensor Hall Effect ICs 1224 in response to the application of an initial braking force against the pedal 1014.

Connector wires 1250a and 1250b extend between the strain gauge element 1180 and the respective strain gauge sensor ICs 1226 mounted on the respective printed circuit boards 1222 in the interior of the respective connector assemblies 1210 and 1220. Another pair of connector wires (not shown) extends between the wake-up switch 1232 in the connector assembly 1230 and the Hall Effect ICs 1224 in the respective connector assemblies 1210 and 1220.

Figure 20:
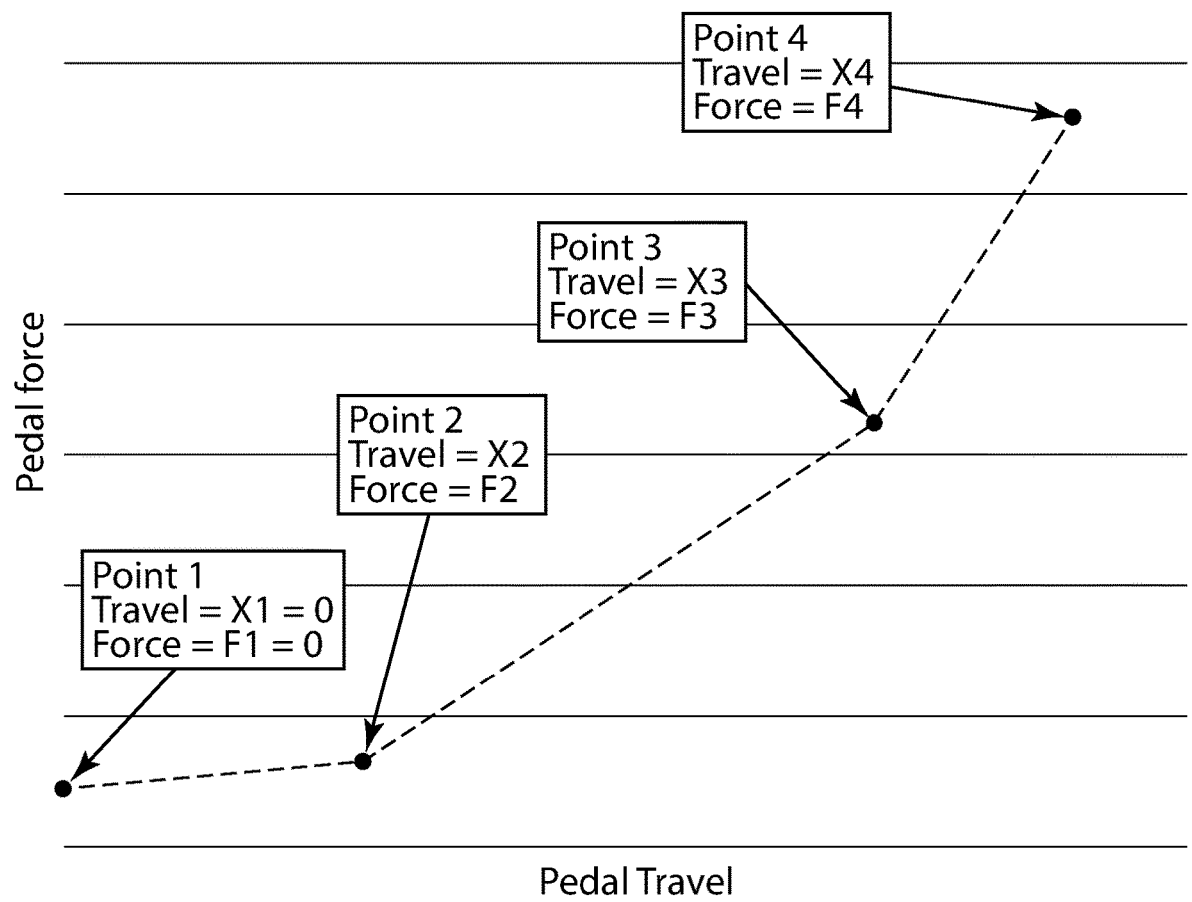
FIG. 20 is a graph depicting the pedal resistance force generated by the pedal resistance assembly shown in FIGS. 9-16 as a function of pedal travel.

The combination of the damper and resistance modules 1110 and 1160 respectively are adapted to create and generate an increasing resistive force on the pedal 1014 in response to the travel or movement of the pedal 1014 during operation of a vehicle for either applying the brakes and increasing the resistance force or releasing the brakes and decreasing the resistance force as represented in the graph of FIG. 20.

Figure 9:
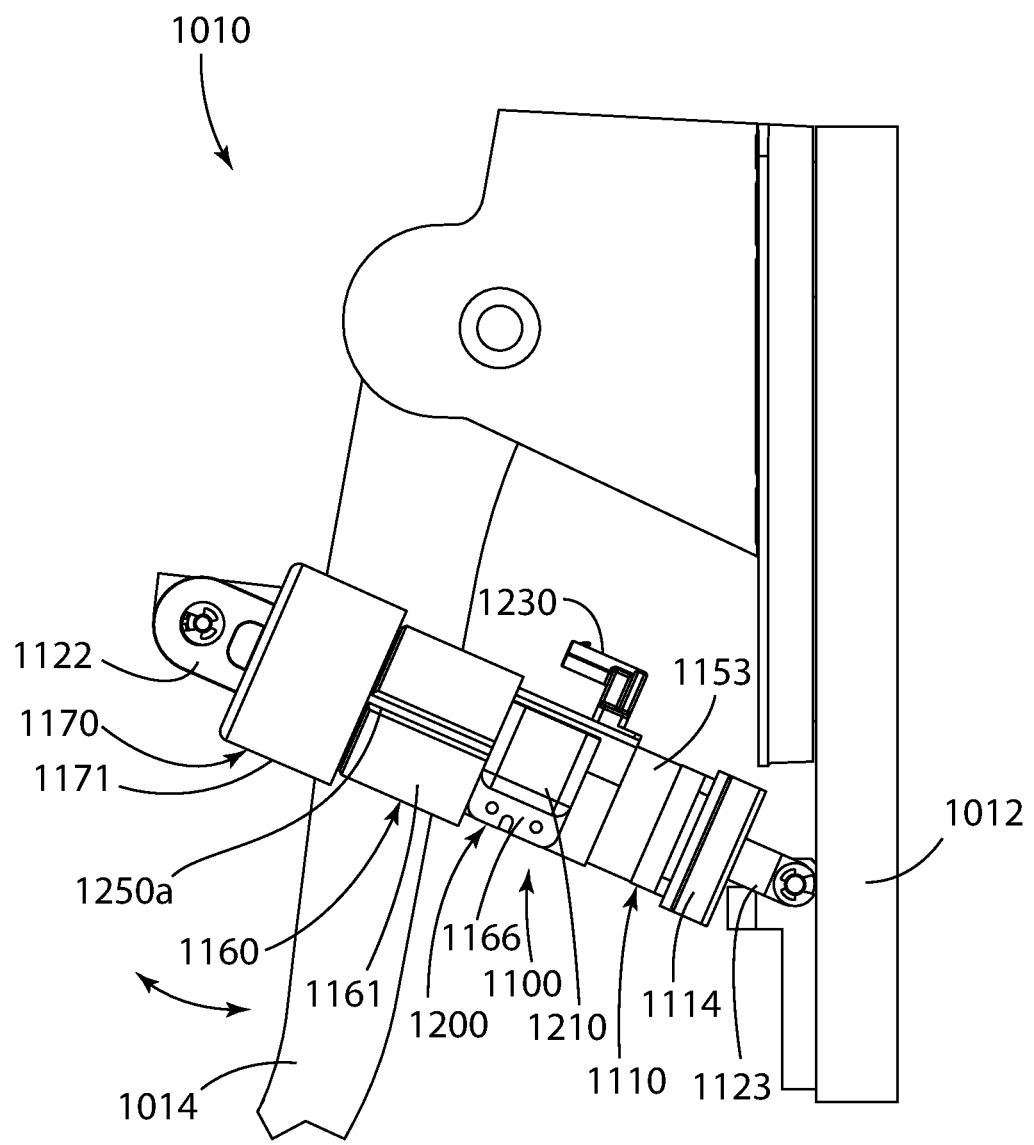
FIG. 9 is a simplified broken side elevational view of a vehicle brake pedal incorporating another embodiment of a pedal resistance force assembly or member in accordance with the present invention.
Figure 10:
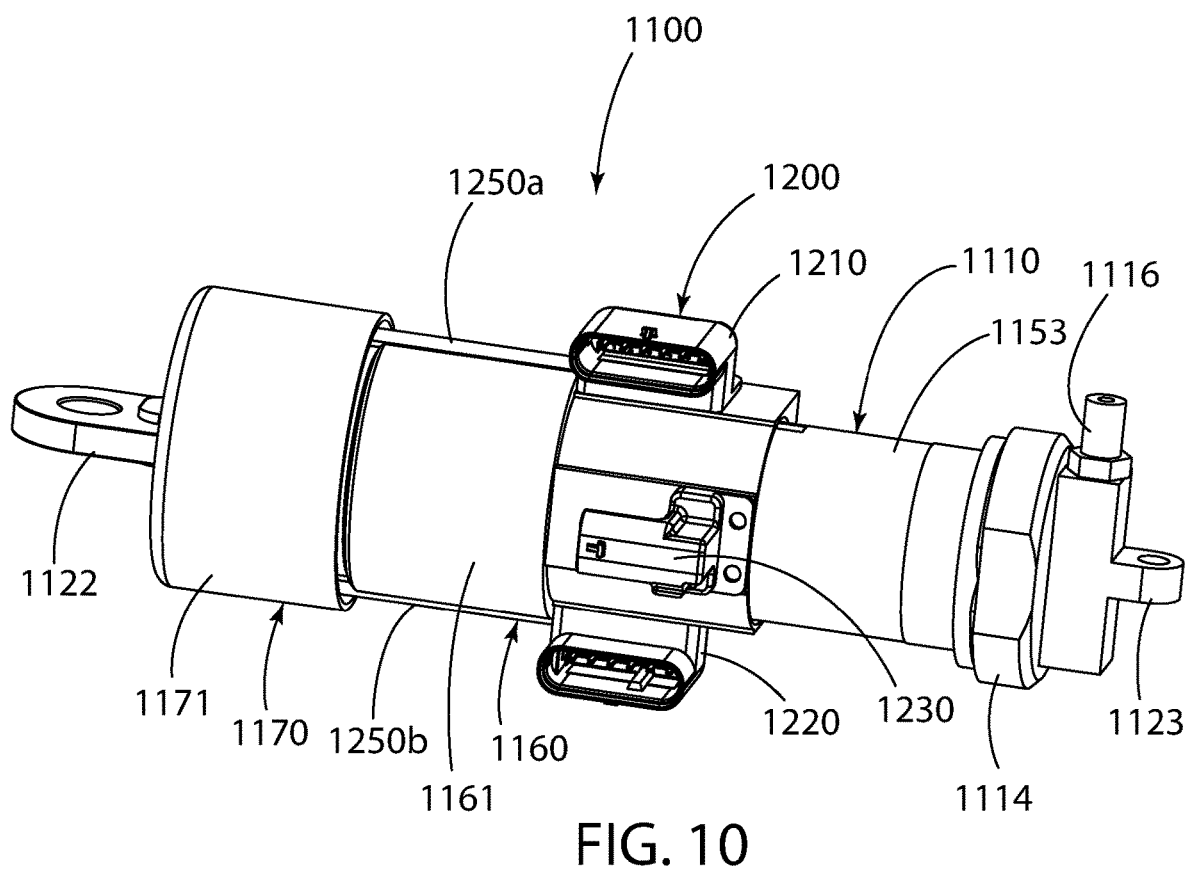
FIG. 10 is a perspective view of the pedal resistance force assembly shown in FIG. 9.
Figure 11:
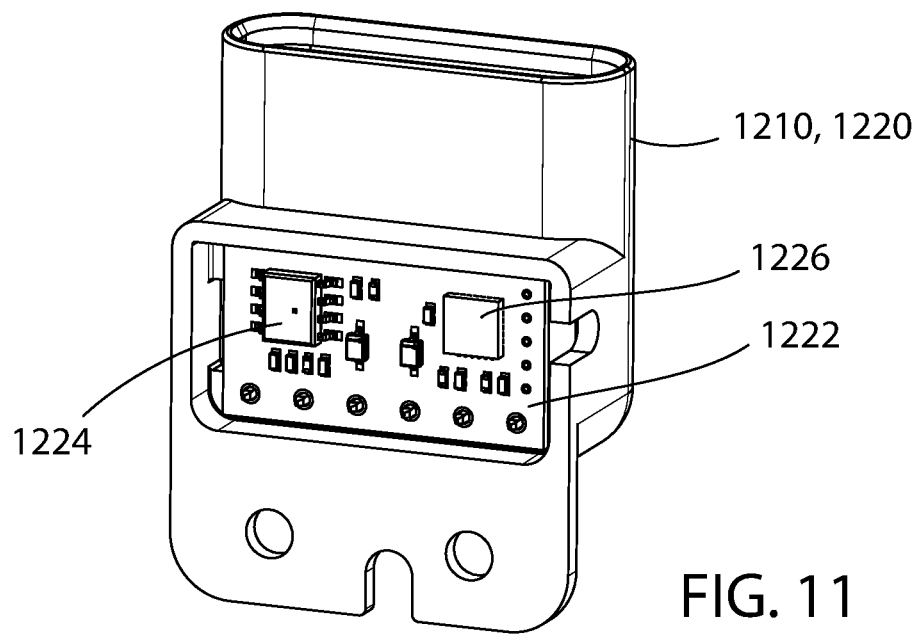
FIG. 11 is a perspective view of one of the connectors incorporating the position and force sensor integrated circuits of the pedal resistance force assembly of FIG. 9.
Figure 12:
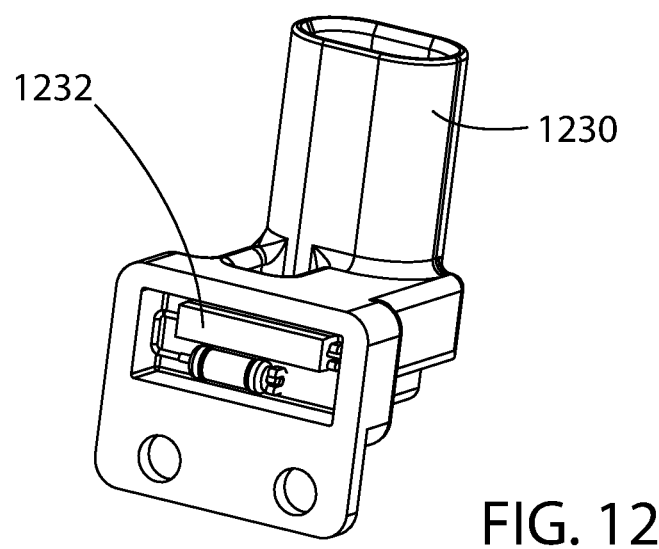
FIG. 12 is a perspective view of another of the connectors incorporating the wake-up switch of the position and force sensor integrated circuits of the pedal resistance force assembly shown in FIG. 9.
Figure 13A:
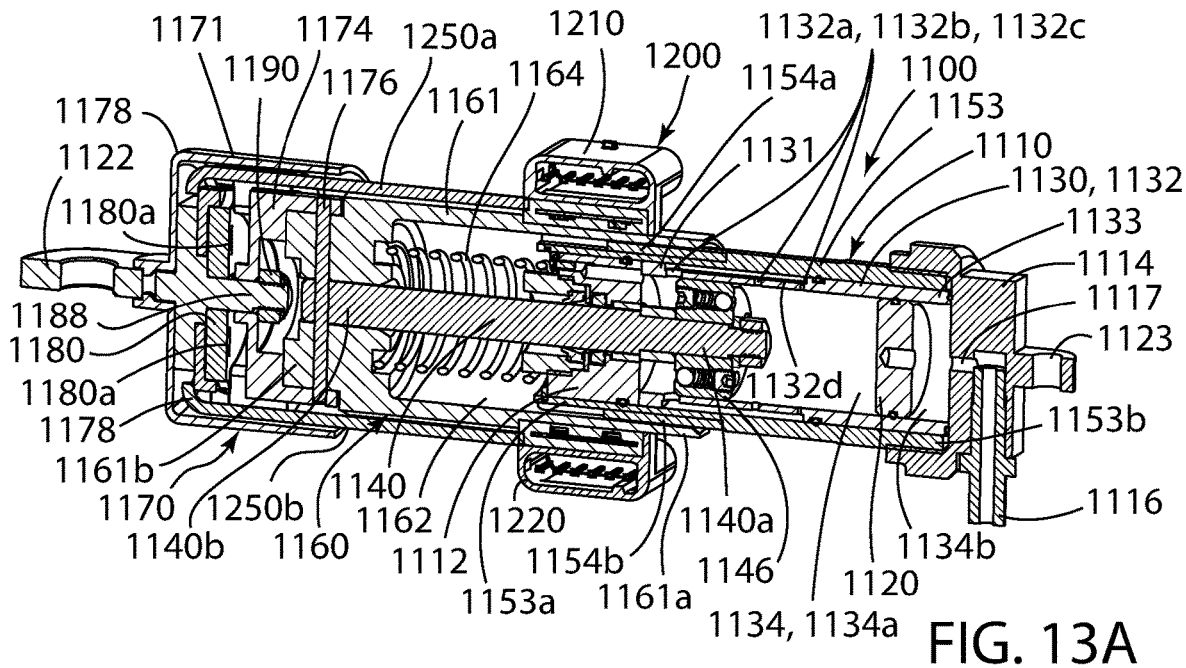
FIG. 13A is a vertical cross-sectional view of the pedal resistance force assembly shown in FIG. 9 in its rest or disengaged or non-braking position.
Figure 13B:
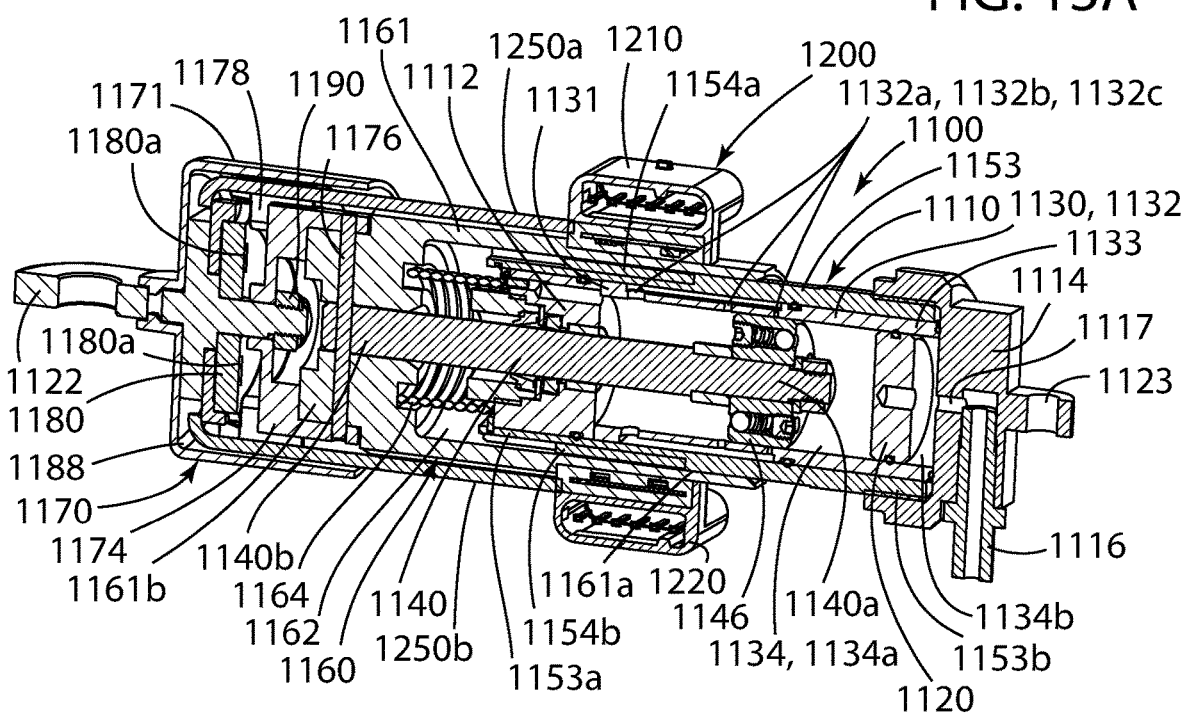
FIG. 13B is a vertical cross-sectional view of the pedal resistance force assembly shown in FIG. 9 in its fully engaged braking position.

Point 1 in the graph of FIG. 20 represents the zero force F1 against the brake pedal 1014 in the Zero travel x1 position of the brake pedal 1014 in the disengaged or non-braking position of the pedal 1014 as shown in FIG. 9 and disengaged or non-braking position of the pedal resistance force assembly or module or member 1100 as shown in FIG. 13A.

Figure 14:
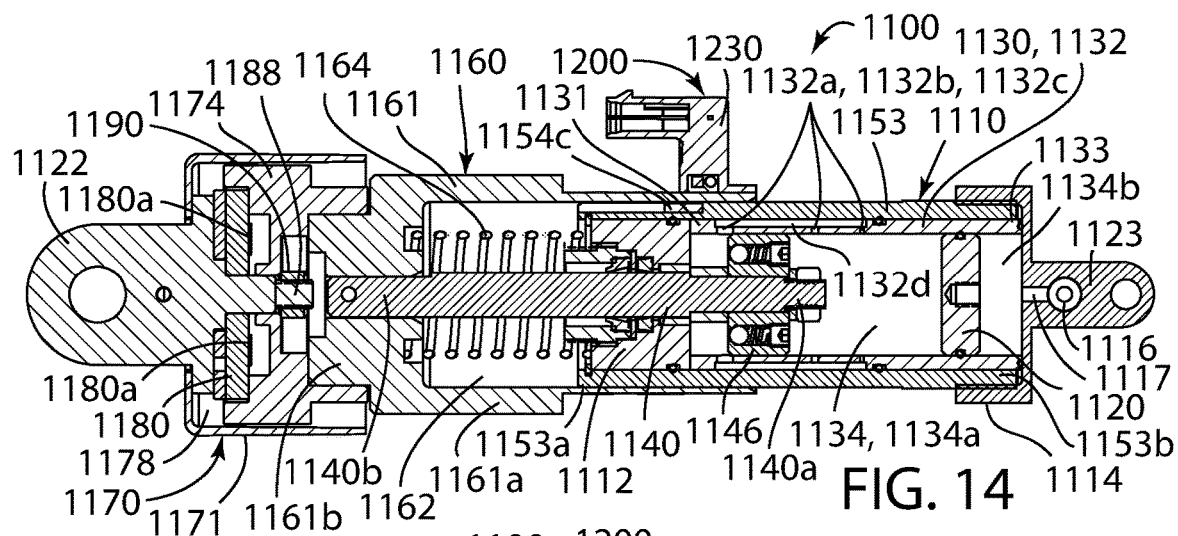
FIG. 14 is a vertical cross-sectional view of the pedal resistance force assembly shown in FIG. 9 in a first partially engaged braking position.

The combination of the damper module 1110 and the spring 1164 of the spring resistance module 1160 are adapted to create and generate an initial resistance or feel force F2 on the brake pedal 1014 that is represented by the Point 2 in the graph of FIG. 20 in response to the depression of the pedal 1014 and resultant movement of the pedal resistance force assembly or module or member 1100 from its FIG. 13A and Point 1 position to its first partially engaged braking Point 2 Travel X2 brake pedal position as shown in FIG. 14.

This initial resistance or feel force is generated in response to the depression of the pedal 1014 which, as shown in FIG. 14, results in the forward movement of the bracket 1122 which in turn results in the forward movement of the force module 1170 which in turn results in the forward sliding movement of the sleeve 1161 relative to the sleeves 1130 and 1153 of the damper module 1110 which in turn results in the forward sliding movement of the shaft 1140 coupled to the sleeve 1161 which in turn results in the movement of the piston 1146 in the interior fluid filled cavity 1134 of the damper module 1110 which in turn generates the initial dampening resistive force against the pedal 1014.

An initial spring resistive force is also generated against the pedal 1014 as a result of the compression of the spring 1164 in response to the forward sliding movement of the sleeve 1161.

Figure 15:
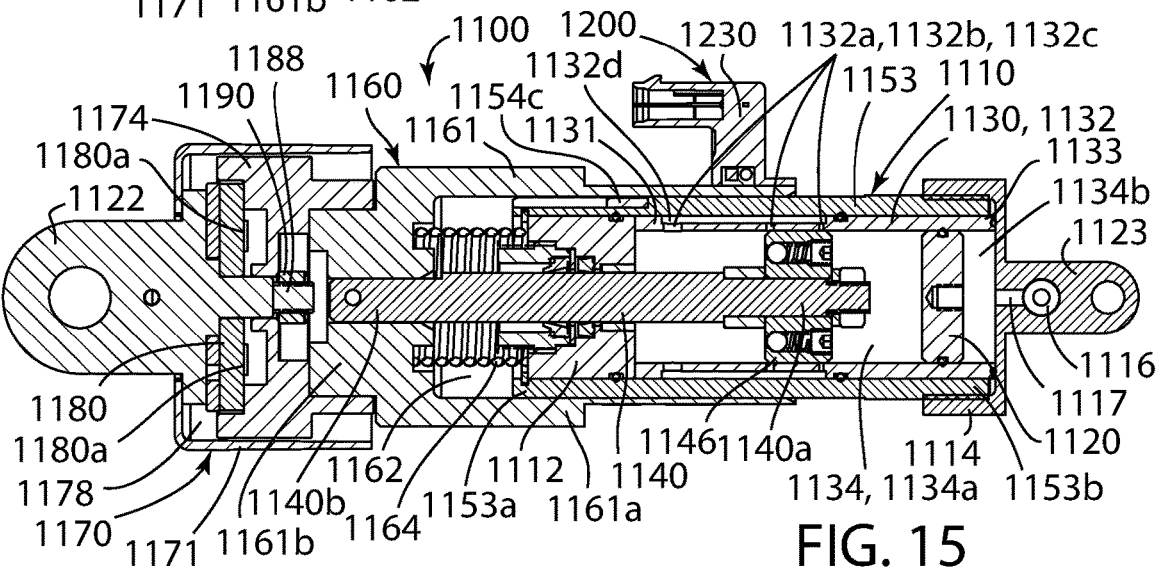
FIG. 15 is a vertical cross-sectional view of the pedal force resistance force assembly shown in FIG. 9 in a second partially engaged braking position.

The additional depression of the pedal 1014 and the resultant movement of the pedal resistance force assembly or module or member 1100 from its FIG. 14 Point 2 position to its FIG. 15 Point 3 Force F3 against the brake pedal 1014 and Travel X3 engaged brake pedal position results in an additional increase in the pedal resistance force against the pedal 1014 as shown in FIG. 20.

Specifically, and referring to FIGS. 14 and 15, the additional forward movement of the sleeve 1161 results in an additional compression of the spring 1164 which results in the application of an additional spring resistive force against the pedal 1014.

The additional forward movement of the sleeve 1160 also results in the additional forward movement of the shaft 1140 which results in the additional forward movement of the piston 1146 in the interior fluid filled cavity 1134 of the damper module 1110 which in turn generates and creates an additional dampening resistive force against the pedal 1014.

Figure 17:
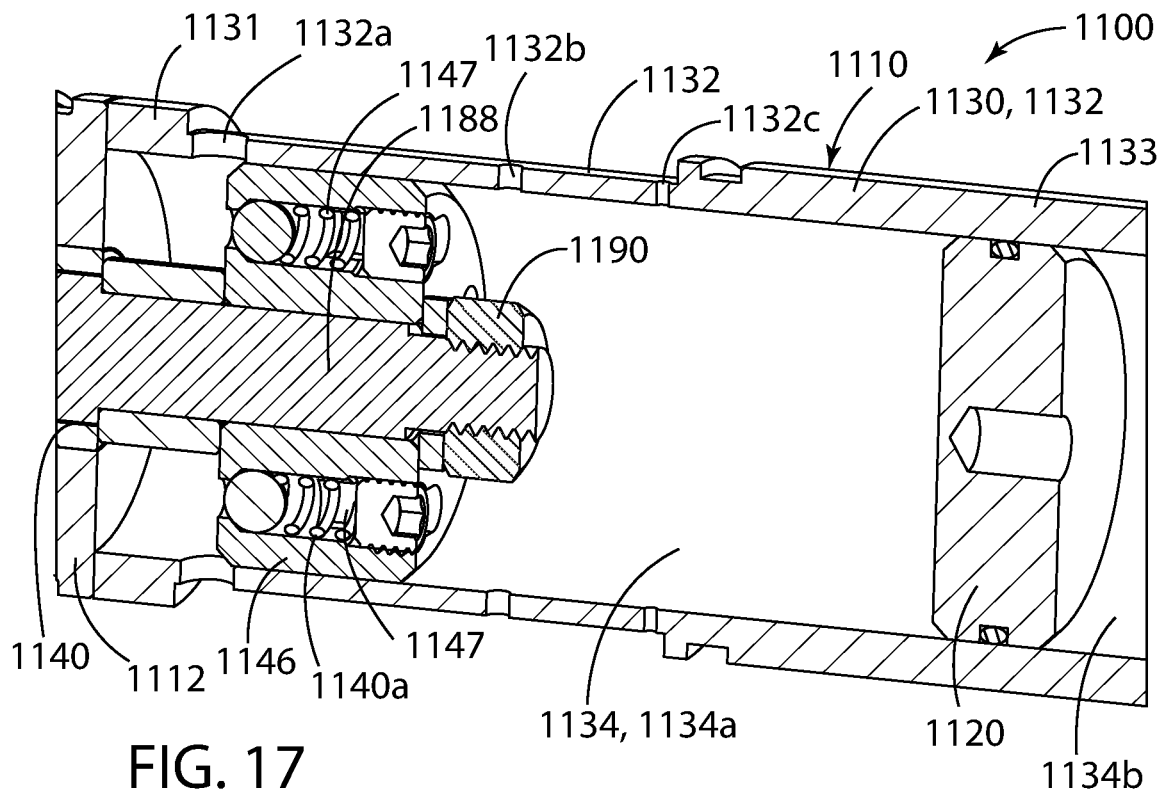
FIG. 17 is an enlarged broken vertical cross-sectional view of the pedal resistance force assembly in the rest or disengaged or non-braking position as shown in FIG. 13.

Also, and referring to FIG. 17, it is understood that the movement of the piston 1146 between the FIG. 13A and FIG. 15 positions results in the movement of the fluid from the portion of the chamber 1134 located fore of the piston 1146 through the respective holes 1132a, b, c and the chamber 1132d and into the portion of the chamber cavity 1134 located aft of the piston 1146 for the purpose of allowing equalization of the fluid volume within the interior of the chamber 1134 in response to movement of the piston 1146 in the chamber 1134.

Figure 16:
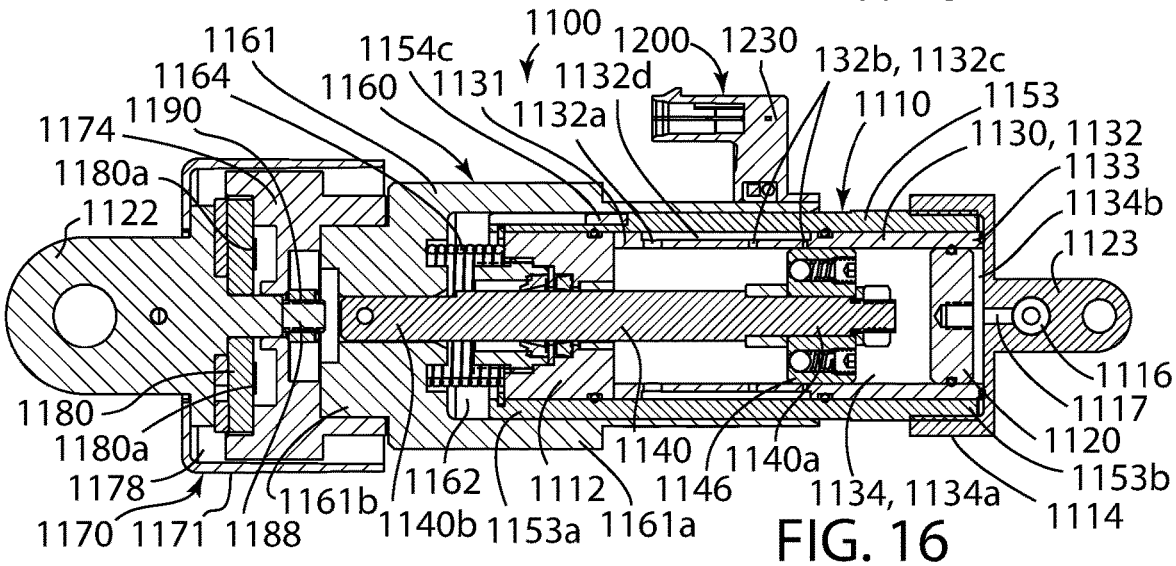
FIG. 16 is another vertical cross-sectional view of the pedal resistance force assembly shown in FIG. 9 in its fully engaged braking position.

The still further depression of the pedal 1014 and the resultant movement of the pedal resistance force assembly or module or member 1100 from its FIG. Point 3 position to its FIG. 16 Point 4 Force F4 against the brake pedal 1014 and Travel X4 brake pedal position results in a still further increase in the pedal resistance force against the pedal 1014 as shown in FIG. 20.

Specifically, and referring to FIGS. 15 and 16, the still further forward movement of the sleeve 1160 results in a still further additional compression of the spring 1164 which results in the application of a still further additional spring resistive force against the pedal 1014.

The still further additional forward movement of the sleeve 1161 also results in the still further additional forward movement of the shaft 1140 which results in the additional forward movement of the piston 1146 in the interior fluid filled cavity 1134 of the damper module 1110 which in turn generates and creates a still further additional dampening resistive force against the pedal 1014.

As shown in FIGS. 14-16, the forward movement of the piston 1146 within the chamber 1134 results in the blocking of successive ones of the fluid holes 1132b and 1132c defined in the wall 1132 of the sleeve 1130 which in turn results in a build-up in the pressure of the fluid in the chamber 1134 which in turn results in the forward movement of the second piston 1120 in the chamber 1134 which in turn results in an increase in the pressure of the air located in the chamber section 1134b of the chamber 1134 which in turn results in the further additional increase in the dampening resistance force against the pedal 1014.

Although not described or shown herein in detail, it is understood that the Points 4, 3, 2, and 1 in FIG. 20 also represent the decreased pedal resistance force on the pedal 1014 generated when the vehicle operator removes foot pressure from the pedal 1014 to release the brakes of the vehicle.

Figure 18:
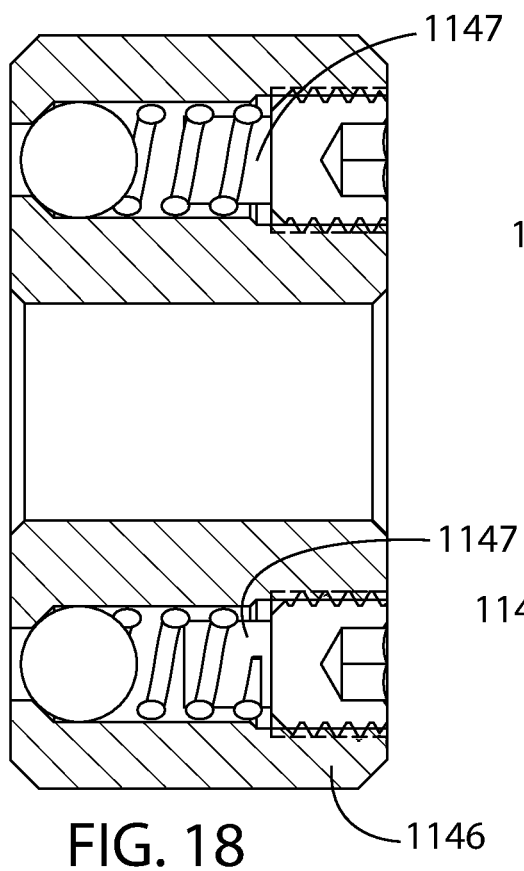
FIG. 18 is an enlarged vertical cross-sectional view of the position of the check valves of the piston of the pedal resistance force assembly in the FIG. 13A-16 positions of the pedal resistance force assembly.
Figure 19:
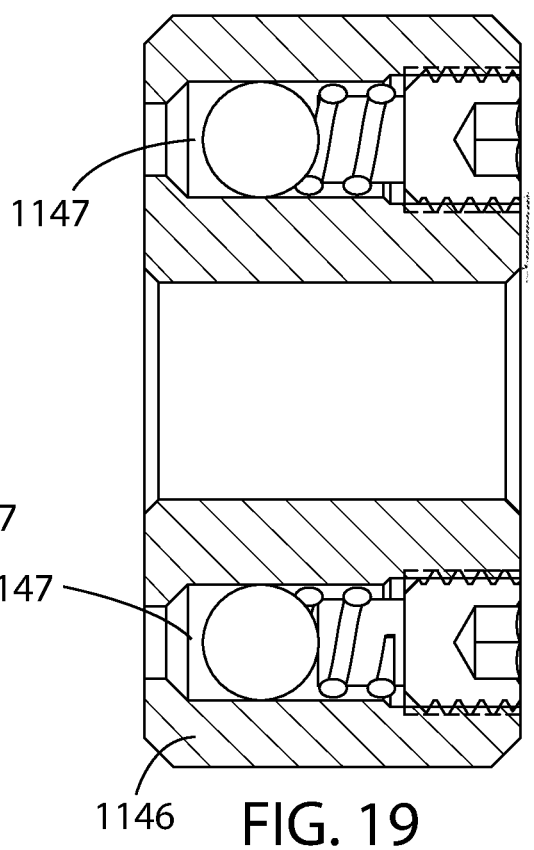
FIG. 19 is an enlarged vertical cross-sectional view of the position of the check valves in the piston of the pedal resistance force assembly during the return of the pedal from its FIG. 16 position to its FIG. 13A position.

In this regard, it is understood that the removal of foot pressure from the pedal 1014 results in the rearward movement of the piston 1146 in the chamber 1134 from its FIG. 16 position back to its FIG. 13A position which results in the movement of the piston check valves from their FIG. 18 closed position to their FIG. 19 open position in which the fluid located in the aft portion of the chamber 1134 is allowed to flow through the check valves 1147 and back into the fore portion of the chamber 1134.

Additionally, and independently, it is understood that the forward movement of the sleeve 1160 results in the forward movement of the connector assemblies 1210 and 1220 mounted thereon and thus the movement of the position sensor Hall Effect ICs 1224 mounted on the respective printed circuit boards 1222 relative to the respective stationary magnets 1154a and 1154b which results in the sensing by the respective Hall Effect ICs 1224 of the changes in the magnitude and/or direction of the magnetic fields of the respective magnets 1154a and 1154b which results in the generation of respective electrical signals which are transferred to a control unit (not shown) for measuring and determining the position of the sleeve 1155 and thus the position of the pedal 1014.

The forward movement of the connector assembly 1230 also results in the movement of the reed switch 1232 relative to the switch magnet 1154c which in turn results in the activation of the switch 1232 which in turn results in the wake-up of the respective position sensor ICs 1224 upon initial depression of the pedal 1014.

Moreover, the depression of the pedal 1014 results in the forward movement of the bracket 1122 which in turn results in the application of a force against the strain gauge disc 1180 which in turn results in a deformation or deflection of the disc 1180 that is sensed by one or more strain gauge elements 1180a located on one or both of the exterior surfaces of the disc 1180 which results in a change of voltage that is sensed by the respective strain gauge elements 1180a and the generation of appropriate electric signals which are transferred to the pedal force sensor IC 1224 on the respective printed circuit board assemblies 1222 of the respective connector assemblies 1210 and 1220 which signals are transferred to a control unit (not shown) for measuring and determining the force being applied to the pedal 1014. The pedal resistance assembly 1100 includes a pair of force sensor assemblies for redundancy reasons.

Numerous variations and modifications of the embodiments of the pedal resistance assembly and pedal force/position sensors of the present invention as described above may be effected without departing from the spirit and scope of the novel features of the invention. It is to be understood that no limitations with respect to the embodiments illustrated herein are intended or should be inferred. It is, of course, intended to cover by the appended claims all such modifications as fall within the scope of the claims.

What is claimed is:

1. A brake pedal assembly comprising:
   a pedal; and
   a pedal resistance force member operably coupled to the pedal and including:
      a damper pedal resistance force module defining an interior fluid-filled cavity;
      a shaft extending through the damper module and including a piston mounted thereon and moveable through the fluid-filled cavity to generate a damper resistance force;
      a spring pedal resistance force module adapted to generate a spring pedal resistance force;
      a pedal force sensing module mounted to the pedal resistance force member;
      a pedal position sensor mounted to the pedal resistance force member;
      a pedal force sensor mounted to the pedal resistance force member, and
      the pedal resistance force member including a moveable sleeve and a fixed sleeve, the moveable sleeve moving in response to the movement of the pedal, the shaft being operably coupled to the moveable sleeve and moveable in response to the movement of the moveable sleeve, the spring pedal resistance force module being coupled to the fixed sleeve and including first and second springs compressible in response to movement and contact with the shaft and the fixed sleeve respectively for generating the spring pedal resistance force,
   wherein the pedal force sensing module is coupled to the moveable sleeve, and
   wherein the spring pedal resistance force module and the pedal force sensing module are located at opposed ends of the pedal resistance force member.

2. The brake pedal assembly of claim 1 wherein the pedal force sensing module includes a deflectable strain gauge plate with a deformable strain gauge element, the strain gauge plate being deflectable and the strain gauge element being deformable in response to the application of a force against the strain gauge plate.

3. The brake pedal assembly of claim 2 further including a bracket coupled to the pedal and extending into the pedal force sensing module and into contact with the deflectable strain gauge plate, the bracket being adapted to exert a force against the deflectable strain gauge plate in response to the movement of the pedal.

4. The brake pedal assembly of claim 1 wherein a magnet is coupled to the fixed sleeve, the pedal position sensor including a Hall Effect sensor mounted to the moveable sleeve and adapted for sensing changes in the magnetic field generated by the magnet for determining the position of the pedal in response to the movement of the Hall Effect sensor relative to the magnet.

5. A pedal resistance force member for a brake pedal and comprising:
   a damper pedal resistance force module defining an interior fluid-filled cavity;
   a shaft extending through the damper module and including a piston mounted thereon and moveable through the fluid-filled cavity to generate a damper resistance force;
   a spring pedal resistance force module adapted to generate a spring pedal resistance force;
   a pedal force sensing module mounted to the pedal resistance force member, the pedal force sensing module including a deflectable strain gauge plate with a deformable strain gauge element, the strain gauge plate being deflectable and the strain gauge element being deformable in response to the application of a force against the strain gauge plate;
   a pedal position sensor mounted to the pedal resistance force member; and
   a bracket coupled to a pedal and extending into the pedal force sensing module and into contact with the deflectable strain gauge plate, the bracket being adapted to exert a force against the deflectable strain gauge plate in response to the movement of the pedal,
   wherein the spring pedal resistance force module and the pedal force sensing modules are located at opposed ends of the pedal resistance force member.

6. The pedal resistance force member of claim 5 wherein a magnet is coupled to a fixed sleeve, the pedal position sensor including a Hall Effect sensor mounted to a moveable sleeve and adapted for sensing changes in the magnetic field generated by the magnet for determining the position of the pedal in response to the movement of the Hall Effect sensor relative to the magnet.

7. A pedal resistance force member for a brake pedal and comprising:
   a damper pedal resistance force module defining an interior fluid-filled cavity;
   a shaft extending through the damper module and including a piston mounted thereon and moveable through the fluid-filled cavity to generate a damper resistance force;
   a spring pedal resistance force module adapted to generate a spring pedal resistance force;
   a pedal force sensing module mounted to the pedal resistance force member, the pedal force sensing module including a deflectable strain gauge plate with a deformable strain gauge element, the strain gauge plate being deflectable and the strain gauge element being deformable in response to the application of a force against the strain gauge plate;
   a pedal position sensor mounted to the pedal resistance force member; and a bracket coupled to a pedal and extending into the pedal force sensing module and into contact with the deflectable strain gauge plate, the bracket being adapted to exert a force against the deflectable strain gauge plate in response to the movement of the pedal, a pedal resistance force member including a moveable sleeve and a fixed sleeve, the moveable sleeve moving in response to the movement of the pedal, the shaft being operably coupled to the moveable sleeve and moveable in response to the movement of the moveable sleeve, the spring pedal resistance force module being coupled to the fixed sleeve and including first and second springs compressible in response to movement and contact with the shaft and the fixed sleeve respectively for generating the spring pedal resistance force.

8. The pedal resistance force member of claim 7 wherein the pedal force sensing module is coupled to the moveable sleeve.

9. The pedal resistance force member of claim 7 wherein a magnet is coupled to the fixed sleeve, the pedal position sensor including a Hall Effect sensor mounted to the moveable sleeve and adapted for sensing changes in the magnetic field generated by the magnet for determining the position of the pedal in response to the movement of the Hall Effect sensor relative to the magnet.

\* \* \* \* \*